(12) United States Patent
Lee et al.

(10) Patent No.: US 9,901,880 B2
(45) Date of Patent: Feb. 27, 2018

(54) CARBON MOLECULAR SIEVE MEMBRANES BASED ON FLUORINE-CONTAINING POLYMER/POLYSILSESQUIOXANE BLENDING PRECURSORS AND METHOD FOR FABRICATING THE SAME

(71) Applicant: Korea Institute of Science and Technology, Seoul (KR)

(72) Inventors: Jong Suk Lee, Seoul (KR); Seung Sang Hwang, Seoul (KR); Sunghwan Park, Seoul (KR); Albert Sung Soo Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 117 days.

(21) Appl. No.: 15/150,056

(22) Filed: May 9, 2016

(65) Prior Publication Data

US 2017/0120200 A1    May 4, 2017

(30) Foreign Application Priority Data

Oct. 29, 2015  (KR) .................. 10-2015-0151008
May 4, 2016    (KR) .................. 10-2016-0055402

(51) Int. Cl.
*B01D 53/22*  (2006.01)
*B01D 67/00*  (2006.01)
*B01D 71/02*  (2006.01)

(52) U.S. Cl.
CPC ....... *B01D 67/0067* (2013.01); *B01D 53/228* (2013.01); *B01D 71/021* (2013.01); *B01D 2323/12* (2013.01); *B01D 2323/24* (2013.01)

(58) Field of Classification Search
CPC .............. B01D 2323/12; B01D 71/021; B01D 67/0067; B01D 53/228; B01D 2323/24
See application file for complete search history.

(56) References Cited

U.S. PATENT DOCUMENTS 5,286,280 A   2/1994  Chiou
5,780,163 A * 7/1998  Camilletti .............. H01L 21/56
                                                    257/E21.502

(Continued)

FOREIGN PATENT DOCUMENTS

JP    2010-513021 A   4/2010
KR    2001-0048205 A  6/2001

(Continued)

OTHER PUBLICATIONS

Kim, Youn Kook, et al. "Carbon molecular sieve membranes derived from thermally labile polymer containing blend polymers and their gas separation properties." Journal of Membrane Science 243.1, 2004, (9-17).

(Continued)

*Primary Examiner* — Anthony Shumate
(74) *Attorney, Agent, or Firm* — NSIP Law

(57) ABSTRACT

Provided is a composition for use in fabricating a carbon molecular sieve membrane, including a fluorine-containing polymer matrix and polysilsesquioxane. The composition shows high selectivity to the gas to be separated and high separation quality by controlling the mixing ratio of the fluorine-containing polymer matrix with polysilsesquioxane as well as the type of fluorine-containing polymer matrix and polysilsesquioxane. Ancillary selective pore formation is enhanced by a so-called "autogenous fluorinated gas induced siloxane etching" (A-FISE) mechanism of fluorine-containing polymer/polysilsesquioxane blend precursors during carbonization. Therefore, it is possible to effectively separate gases having a small difference in particle size, which, otherwise, are difficult to be separated with the conventional polymer membranes.

11 Claims, 24 Drawing Sheets

(56) References Cited

U.S. PATENT DOCUMENTS

| | | | |
|---|---|---|---|
| 6,730,145 B1* | 5/2004 | Li | B01D 53/22 |
| | | | 427/245 |
| 8,486,179 B2 | 7/2013 | Kiyono et al. | |
| 8,911,534 B2 | 12/2014 | Koros et al. | |
| 9,773,901 B1* | 9/2017 | Gluschenkov | H01L 29/7827 |
| 2003/0185741 A1* | 10/2003 | Matyjaszewski | B82Y 10/00 |
| | | | 423/445 R |
| 2003/0222015 A1* | 12/2003 | Oyama | B01D 53/228 |
| | | | 210/500.21 |
| 2005/0150383 A1 | 7/2005 | Kang et al. | |
| 2008/0044679 A1* | 2/2008 | Maeda | B22F 1/02 |
| | | | 428/546 |
| 2009/0246114 A1* | 10/2009 | Sah | B01D 61/362 |
| | | | 423/352 |
| 2009/0299015 A1* | 12/2009 | Liu | B01D 53/228 |
| | | | 525/418 |
| 2010/0326273 A1* | 12/2010 | Liu | B01D 67/0079 |
| | | | 95/45 |
| 2011/0076416 A1* | 3/2011 | Klipp | C08G 77/06 |
| | | | 427/487 |
| 2013/0146530 A1* | 6/2013 | Wang | B01D 67/0079 |
| | | | 210/500.38 |
| 2014/0301090 A1* | 10/2014 | Doi | B32B 27/08 |
| | | | 362/382 |
| 2015/0000527 A1 | 1/2015 | Lee et al. | |
| 2015/0027306 A1* | 1/2015 | Tan | C08L 83/04 |
| | | | 95/55 |

FOREIGN PATENT DOCUMENTS

| | | |
|---|---|---|
| KR | 10-2005-0072921 A | 7/2005 |
| KR | 10-2009-0032728 A | 4/2009 |
| KR | 10-2013-0113184 A | 10/2013 |
| WO | WO 2008/076599 A1 | 6/2008 |
| WO | WO 2013/181407 A2 | 12/2013 |

OTHER PUBLICATIONS

Chng, Mei Lin, et al. "Enhanced propylene/propane separation by carbonaceous membrane derived from poly (aryl ether ketone)/2, 6-bis (4-azidobenzylidene)-4-methyl-cyclohexanone interpenetrating network." Carbon 47.7, 2009, (1857-1866).

Kiyono, Mayumi, et al. "Effect of polymer precursors on carbon molecular sieve structure and separation performance properties." Carbon 48.15, 2010, (4432-4441).

Kiyono, Mayumi, et al. "Generalization of effect of oxygen exposure on formation and performance of carbon molecular sieve membranes." Carbon 48.15, 2010, (4442-4449).

Kiyono, Mayumi, et al. "Effect of pyrolysis atmosphere on separation performance of carbon molecular sieve membranes." Journal of Membrane Science 359.1, 2010, (2-10).

Rungta, Meha, et al. "Structure—performance characterization for carbon molecular sieve membranes using molecular scale gas probes." Carbon 85, 2015, (429-442).

* cited by examiner

CARBON MOLECULAR SIEVE MEMBRANES BASED ON FLUORINE-CONTAINING POLYMER/POLYSILSESQUIOXANE BLENDING PRECURSORS AND METHOD FOR FABRICATING THE SAME

CROSS-REFERENCE TO RELATED APPLICATION

This application claims priority to Korean Patent Application No. 10-2015-0151008, filed on Oct. 29, 2015 and Korean Patent Application No. 10-2016-0055402, filed on May 4, 2016, and all the benefits accruing therefrom under 35 U.S.C. § 119, the contents of which in its entirety are herein incorporated by reference.

BACKGROUND

1. Field

The present disclosure relates to a carbon molecular sieve membrane having excellent gas permeability and selectivity.

[Description about National Support Research and Development]

This study is made by the support of Global Advanced Technology Development (Energy and Resources Policy Division) of Korea Ministry of Trade, Industry and Energy Science under the supervision of Kocat Inc. (Research Management Specialized Organization: Korea Institute of Energy Technology Evaluation and Planning, Subject Identification No.: 1415136879).

This study is made by the support of Development of high performance olefin/paraffin hybrid sieve of Korea Ministry of Science, ICT and Future Planning (Research Management Specialized Organization: Future Leading Integrated Research Group Business, Subject Identification No.: Integrated Research Group 14-1-KRICT) under the supervision of KOREA RESEARCH INSTITUTE OF CHEMICAL TECHNOLOGY.

2. Description of the Related Art

In the petrochemical industry, ethylene/ethane or propylene/propane is a very important compound and forms a significantly large market all over the world. Such type of olefin/paraffin separation has been carried out by cryogenic distillation in general. However, the cryogenic distillation undesirably consumes a large amount of energy, and thus many attempts have been made to substitute it with energy-efficient membrane technology. In addition to this, there has been an increasing need for developing a gas separator membrane based on a Carbon Molecular Sieve (CMS), which is a membrane showing excellent quality in separating hardly separable gas molecules, such as $O_2/N_2$ or $CO_2/CH_4$, having a small difference in molecular size.

Such excellent gas separation quality of the CMS gas separator membrane is based on a combination of micropores (6-20 Å) having very high permeability with ultramicropores (≤6 Å) functioning as molecular sieve. Determination of the structure of such a CMS membrane is affected by various factors, including a polymer precursor, pyrolysis temperature, heating rate, pyrolysis time and pyrolysis condition. In general, as the free volume ratio of a polymer precursor is increased, the CMS shows higher separation quality. Referring to the treatment conditions, as the pyrolysis temperature is increased, the permeability tends to be decreased and the selectivity tends to be increased, while smaller micropores and ultramicropores are formed. In addition, as the heating rate is increased, the permeability tends to be increased and the selectivity tends to be decreased in general. It is thought that this may be closely related with the production rate of byproducts and firing of pores. In addition, as the pyrolysis time is increased, the selectivity tends to be increased but the permeability tends to be decreased (see, U.S. Pat. No. 8,911,534). Particularly, the pyrolysis temperature and polymer precursor play important roles in determining the quality of a CMS membrane. Koros Group (Georgia Institute of Technology, USA) has demonstrated that the separation quality of a CMS membrane can be determined by controlling the amount of oxygen during pyrolysis (Kiyono M, Williams P J, and Koros W J. Journal of Membrane Science 2010; 359(1-2):2-10, U.S. Pat. No. 8,486,179).

REFERENCES

Patent Documents

U.S. Pat. No. 8,911,534
U.S. Pat. No. 8,486,179

Non-Patent Documents

Kiyono M, Williams P J, and Koros W J. Journal of Membrane Science 2010; 359(1-2):2-10.
Rungta M, Xu L R, and Koros W J. Carbon 2015; 85: 429-442.

SUMMARY

The present disclosure is directed to providing a composition for use in fabricating a carbon molecular sieve membrane having high gas permeability and high gas selectivity. The present disclosure is also directed to providing a carbon molecular sieve membrane obtained by using the composition, a method for fabricating the same and a method for separating gases.

In one aspect, there is provided a composition for use in fabricating a Carbon Molecular Sieve (CMS) membrane, comprising a fluorine-containing polymer matrix, and polysilsesquioxane.

In another aspect, there is provided a carbon molecular sieve membrane comprising the carbonized product of the composition for use in fabricating a carbon molecular sieve membrane.

In still another aspect, there is provided a method for fabricating a carbon molecular sieve membrane, comprising: dissolving a composition comprising a fluorine-containing polymer matrix and polysilsesquioxane into an organic solvent; forming a film from the dissolved composition and removing the organic solvent therefrom to obtain a polymer membrane; and carrying out carbonization of the carbon molecular sieve membrane. There is also provided a gas separation method using the carbon molecular sieve membrane.

The composition for use in fabricating a carbon molecular sieve membrane disclosed herein includes a fluorine-containing polymer matrix having a high free volume and high glass transition temperature as organic polymer and the fluorine-containing polymer matrix is mixed with polysilsesquioxane so that the polysilsesquioxane may be dispersed homogeneously at the molecular level of the polymer matrix and membrane. In addition, according to some embodiments of the present disclosure, it is possible to control the silicon etching of the polysilsesquioxane by selecting the types of the fluorine-containing polymer matrix and polysilsesquioxane, or by adjusting the mixing ratio or carbonization temperature. Thus, it is possible to control the size of the ultramicropores of the carbon molecular sieve. In addition, according to the present disclosure, it is possible to induce additional ultramicropores by using a silicon etching phenomenon, and thus to improve the selectivity of a carbon molecular sieve membrane even at a relatively low temperature. Therefore, a novel method for controlling the size and distribution of ultramicropores and micropores is provided according to the present disclosure, thereby making it possible to provide high selectivity to the gas to be separated and high separation quality. As a result, it is possible to improve the separation quality of the conventional polymer membranes. Particularly, it is possible to effectively separate hardly separable gas molecules, such as oxygen ($O_2$)/nitrogen ($N_2$), carbon dioxide ($CO_2$)/carbon tetrachloride ($CH_4$), propylene ($C_3H_6$)/propane ($C_3H_8$) and ethylene ($C_2H_4$)/ethane ($C_2H_6$).

DETAILED DESCRIPTION

Exemplary embodiments now will be described more fully hereinafter.

In one aspect, there is provided a composition for use in fabricating a carbon molecular sieve (CMS) membrane, including: a fluorine-containing polymer matrix; and polysilsesquioxane (PSQ).

According to an embodiment, the composition may include a ladder-structured polysilsesquioxane (LSPQ) represented by the following Chemical Formula 1:

[Chemical Formula 1]

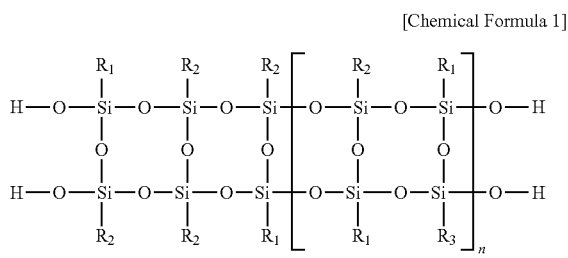

wherein each of $R_1$, $R_2$ and $R_3$ independently represents an organic functional group selected from the group consisting of aromatic phenyl, heteroaromatic phenyl, aliphatic alkyl, cycloaliphatic alkyl, vinyl, aryl, methacrylate, acrylate and epoxy groups, and n is an integer selected from 1-10,000.

According to another embodiment, the polysilsesquioxane may be selected from the group consisting of ladder-structured poly(phenyl-co-methacryloxypropyl) silsesquioxane, ladder-structured poly(phenyl-co-glycidoxypropyl) silsesquioxane and ladder-structured poly(phenyl-co-pyridylethyl) silsesquioxane.

According to still another embodiment, the molar ratio of $R_1:R_2$ may be 0.1:99.9-99.9:0.1, as expressed in terms of the copolymerization ratio of the organic functional groups in the polysilsesquioxane. Particularly, the ratio of $R_1:R_2$ may be 10:90-90:10, 20:80-80:20, 30:70-70:30, 50:50-70:30 or 55:45-65:35. More particularly, the ratio of $R_1:R_2$ may be about 6:4. According to still another embodiment, the polysilsesquioxane may have a number average molecular weight of $10^2$-$10^8$, particularly $10^3$-$10^7$ or $10^4$-$10^6$.

According to still another embodiment, the fluorine-containing polymer matrix contained in the composition may include 2,2-bis(3,4-carboxyphenyl) hexafluoropropane dianhydride (6-FDA) based polyimide represented by the following Chemical Formula 2:

[Chemical Formulal 2]

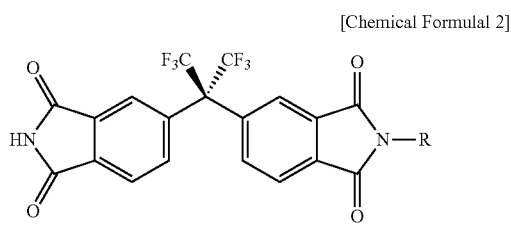

wherein R is a C1-C20 aliphatic alkyl containing F or not; an alicyclic alkyl, including a monocyclic ring, dicyclic ring, heterocyclic ring or multicyclic ring; or a carbon compound containing an aromatic ring.

More particularly, the 6-FDA based polyimide may include at least one selected from the group consisting of 6FDA-DAM (diamino-mesitylene), 6FDA-mPDA (m-phenylenediamine), 6FDA-DABA (diaminobenzoic acid), 6FDA-DETDA, 6FDA:BPDA (1:1)-DETDA, 6FDA-1,5 ND:ODA (1:1), 6FDA-DETDA:DABA (3:2), 6FDA-DAM: mPDA (3:2), 6FDA-DAM:DABA (3:2) and 6FDA-mPDA: DABA (3:2), but is not limited thereto.

Figure 1A:
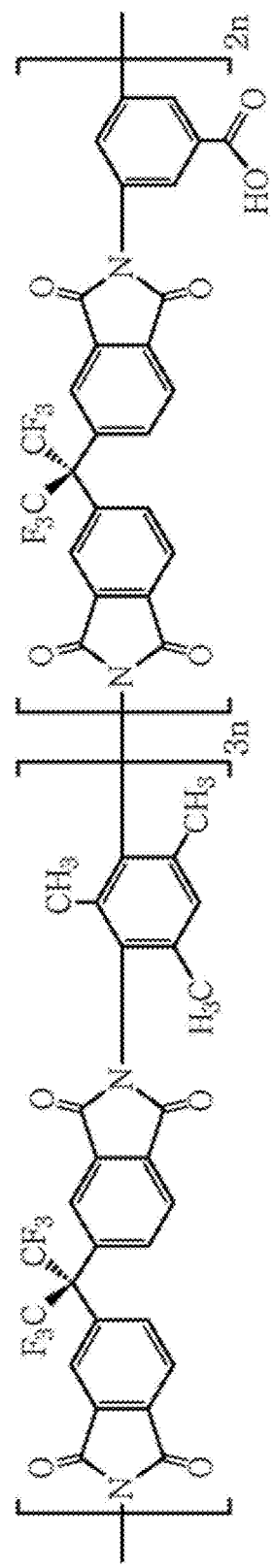
FIG. 1A shows the chemical structure of 6FDA-DAM: DABA (3:2) (fluorine-containing polymer matrix) according to an embodiment.
Figure 1B:
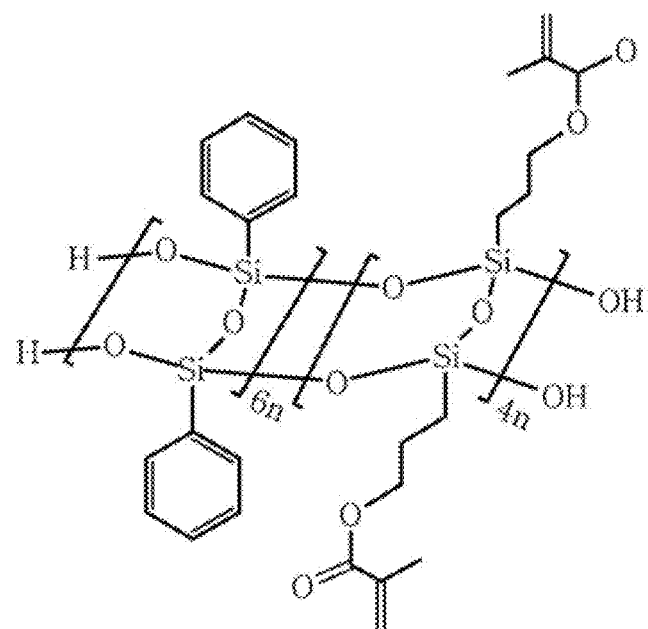
FIG. 1B shows the chemical structure of LPMA64 (ladder-structured polysilsesquioxane) according to an embodiment.
Figure 1C:
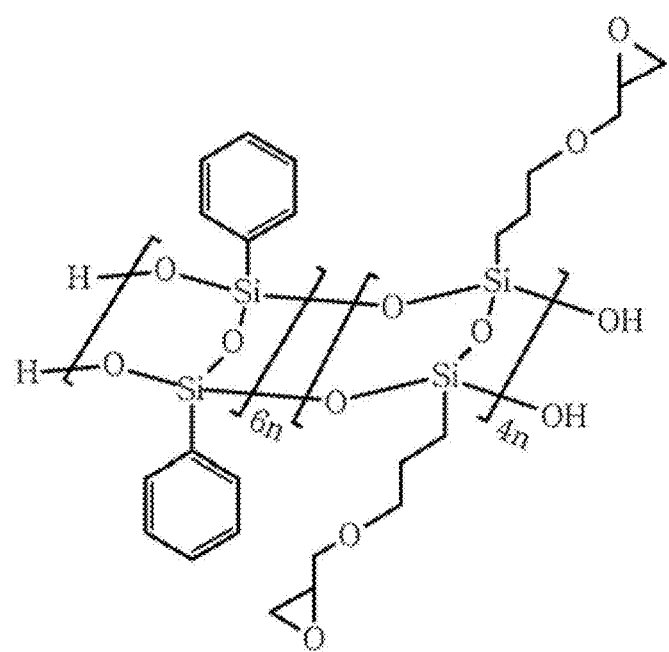
FIG. 1C shows the chemical structure of LPG64 (ladder-structured polysilsesquioxane) according to an embodiment.
Figure 1D:
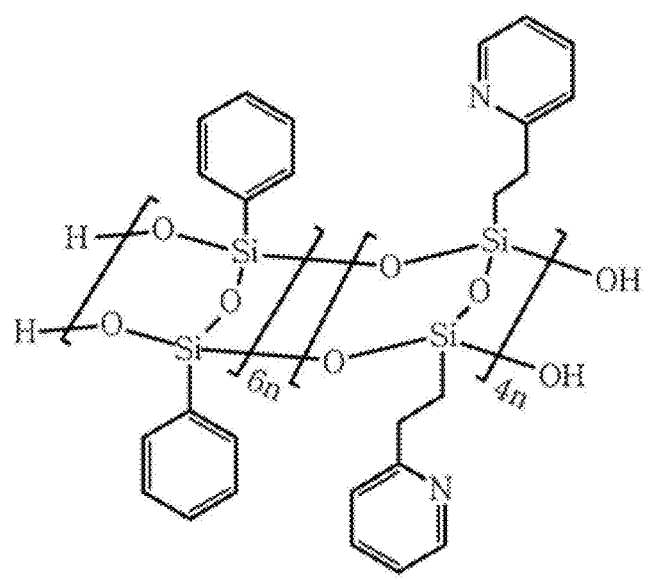
FIG. 1D shows the chemical structure of LPPyr64 (ladder-structured polysilsesquioxane) according to an embodiment.

FIGS. 1A to 1D show an embodiment of the fluorine-containing polymer matrix and polysilsesquioxane used in the composition for use in fabricating a carbon molecular sieve membrane disclosed herein. FIG. 1A shows an embodiment of the fluorine-containing polymer matrix, 6FDA-DAM:DABA (3:2), and FIGS. 1B, 10 and 1D each show an embodiment of ladder-structured polysilsesquioxane, i.e., LPMA64 (ladder-structured poly(phenyl-co-methacryl)silsesquioxane represented by Chemical Formula 1 wherein the ratio of $R_1:R_2$ is 6:4), LPG64 (ladder-structured poly(phenyl-co-glycidoxypropyl)silsesquioxane represented by Chemical Formula 1 wherein the ratio of $R_1:R_2$ is 6:4) and LPPyr64 (ladder-structured poly(phenyl-co-pyridylethyl)silsesquioxane represented by Chemical Formula 1 wherein the ratio of $R_1:R_2$ is 6:4).

According to still another embodiment, the composition for use in fabricating a carbon molecular sieve membrane may include the polysilsesquioxane and the fluorine-containing polymer matrix in a weight ratio of 0.1:99.9-99.9: 0.1. Particularly, the weight ratio may be 10:90-80:20. More particularly, the weight ratio may be 5:95-30:70, but is not limited thereto. According to still another embodiment, it is possible to control the gas separation quality according to the mixing ratio of the polysilsesquioxane to the fluorine-containing polymer matrix.

In still another aspect, there is provided a carbon molecular sieve membrane including the carbonized product of the composition for use in fabricating a carbon molecular sieve membrane.

In the composition, the fluorine-containing polymer matrix generates an etching gas, such as fluoroform ($CHF_3$) or hydrogen fluoride (HF) when it is carbonized. The polysilsesquioxane forms a secondary bonding, including hydrogen bonding, with the polymer matrix so that it may be bound homogeneously to the polymer matrix, or dispersed non-homogeneously in the polymer matrix without hydrogen bonding. In both cases, the composition provides relatively higher selectivity by virtue of an etching effect, as compared to the carbon molecular sieve membranes based on pure polymer precursors. As used herein, the term 'secondary bonding' means an intermolecular bonding. The secondary bonding includes hydrogen bonding and Van der Waals bonding and is differentiated from an interatomic primary bonding, such as ionic bonding.

According to an embodiment, the composition including the composition containing the blend of the fluorine-containing polymer matrix with polysilsesquioxane is used as precursor for fabricating a carbon molecular sieve membrane. Thus, when carbonizing the composition, the etching gas generated from the fluorine-containing polymer matrix etches the silica chemical moieties (e.g. Si—O—Si, $SiO_2$, Si—C) of polysilsesquioxane to form ultramicropores in the carbon molecular sieve membrane.

According to another embodiment, the carbon molecular sieve membrane may include ultramicropores having an average size equal to or less than 1 Å and less than 6 Å. More particularly, the ultramicropores may have an average size equal to or less than 4 Å and less than 6 Å. In a variant, the carbon molecular sieve membrane may include ultramicropores having an average size less than 6 Å and micropores having an average size of 6-20 Å. Herein, the size of the ultramicropores and that of the micropores may be determined by analyzing the carbon molecular sieve membrane through low-temperature $CO_2$ adsorption on the basis of the density functional theory.

More particularly, the carbon molecular sieve membrane may include ultramicropores and micropores in a volume or area ratio of 0.1:99.9-10.0:90.0. The carbon molecular sieve membrane disclosed herein includes ultramicropores functioning as molecular sieve in addition to micropores providing high gas permeability, and thus has a dual structure of micropores and ultramicropores. Therefore, the carbon molecular sieve membrane disclosed herein allows effective separation even in the case of small-molecular size gases, and thus shows excellent gas separation quality.

According to still another embodiment, the carbon molecular sieve membrane disclosed herein may separate gases having a difference in molecular size of 0.1 Å-5 Å effectively. Particularly, the difference in molecular size of the gases that may be separated according to the present disclosure may be at least 0.1 Å, at least 0.15 Å, at least 0.2 Å, at least 0.3 Å, at least 0.4 Å, at least 0.5 Å, at least 1 Å, at least 2 Å, at least 3 Å, at least 4 Å or 5 Å, and at most 5 Å, at most 4 Å, at most 3 Å, at most 2 Å, at most 1.5 Å, at most 1 Å, at most 0.8 Å, at most 0.6 Å, at most 0.5 Å, at most 0.4 Å, at most 0.3 Å, at most 0.2 Å or 0.1 Å. For example, it is possible to separate the gases selected from the group consisting of oxygen/nitrogen, carbon dioxide/carbon tetrachloride, carbon dioxide/nitrogen, nitrogen/carbon tetrachloride, n-butane/i-butane, propylene/propane and ethylene/ethane. Herein, oxygen has a molecular size of about 3.46 Å, nitrogen has a molecular size of about 3.64 Å, carbon dioxide has a molecular size of about 3.3 Å, and carbon tetrachloride has a molecular size of about 3.8 Å. In the case of propylene/propane, propylene has a larger kinetic diameter (4.5 Å vs. 4.3 Å) but has a smaller minimum molecular size and minimum length (4.0 Å vs. 4.2 Å and 5.1 Å vs. 5.4 Å), as compared to propane. Thus, it is possible to separate propylene from propane on the basis of entropic selectivity.

In still another aspect, there is provided a method for fabricating a carbon molecular sieve membrane, including: dissolving a composition including a fluorine-containing polymer matrix and polysilsesquioxane into an organic solvent; forming a film from the dissolved composition and removing the organic solvent therefrom to obtain a polymer membrane; and carrying out carbonization of the carbon molecular sieve membrane.

According to an embodiment, the organic solvent may be at least one selected from the group consisting of N-methyl-2-pyrrolidone (NMP), dimethylformamide (DMF), tetrahydrofuran (THF) and methylene chloride (MC). However, any solvent may be used as long as it dissolves the fluorine-containing polymer matrix and polysilsesquioxane and then is removed.

According to another embodiment, the dissolving operation may include dissolving a blend including the solid contents of the fluorine-containing polymer matrix and polysilsesquioxane with an organic solvent at a weight ratio of 0.1:99.9-40:60. More particularly, the weight of the solid contents of the fluorine-containing polymer matrix and polysilsesquioxane may be at least 0.1 wt %, at least 1 wt %, at least 5 wt %, at least 10 wt %, at least 15 wt %, at least 20 wt %, at least 25 wt %, at least 30 wt %, at least 35 wt % or 40 wt %, and at most 40 wt %, at most 35 wt %, at most 30 wt %, at most 25 wt %, at most 20 wt %, at most 15 wt %, at most 10 wt %, at most 5 wt %, at most 1 wt % or 0.1 wt %, based on the total weight of the solid contents of the fluorine-containing polymer matrix and polysilsesquioxane and the organic solvent. More particularly, the solid contents of the fluorine-containing polymer matrix and polysilsesquioxane may be present in an amount of 0.1-40 wt %, 1-30 wt %, 5-20 wt % or 7-13 wt % based on the total weight of the dissolved materials. When the weight of the solid contents of the fluorine-containing polymer matrix and polysilsesquioxane is larger than 40 wt %, it is difficult to carrying out filming of the carbon molecular sieve membrane. When the weight of the solid contents of the fluorine-containing polymer matrix and polysilsesquioxane is less than 0.1 wt %, gas separation quality is degraded.

According to still another embodiment, the method may further include controlling at least one of the molecular weight of the fluorine-containing polymer matrix and that of the polysilsesquioxane and weight ratio of them to control the formation of the ultramicropores in the carbon molecular sieve membrane. In other words, the etching degree of silicon may be controlled through the mixing ratio of the polymer matrix to polysilsesquioxane under the same pyrolysis condition so that the gas separation quality of the carbon molecular sieve membrane may be controlled.

For example, the separation quality of propylene/propane may be improved as the content of polysilsesquioxane is increased. Particularly, in the case of a composition containing no polysilsesquioxane, propylene/propane selectivity is 17.8 (–). However, in the case of a blend including polysilsesquioxane and the fluorine-containing polymer matrix at a weight ratio of 20:80, propylene/propane selectivity is 102.2 (–).

According to still another embodiment, it is possible to control gas separation quality by adjusting carbonization temperature and carbonization time and thus etching degree of silicon. For example, carbonization of the polymer membrane may include carrying out carbonization of the polymer membrane at a temperature of 500-1000° C. In addition, according to a particular embodiment, carbonization of the polymer membrane may include carrying out carbonization of the polymer membrane for 5-12 hours. According to another particular embodiment, carbonization of the polymer membrane may include carrying out carbonization of the polymer membrane under at least one condition selected from argon atmosphere, nitrogen atmosphere, air atmosphere and vacuum.

In yet another aspect, there is provided a method for separating gases by using the carbon molecular sieve membrane. According to an embodiment, the method may include passing the gases to be separated through the carbon molecular sieve membrane. According to a particular embodiment, this may be carried out by supplying the gases to the carbon molecular sieve membrane so that they may be in contact with the carbon molecular sieve membrane. According to another embodiment, the method may further include removing the gases after they are passed through the carbon molecular sieve membrane.

According to still another embodiment, the method may include separating at least one gas from a mixed gas of at least two gases. According to still another embodiment, the method may include separating gases having a difference in molecular size of 0.1 Å-5 Å. For example, the method may include separating gases selected from the group consisting of oxygen/nitrogen, carbon dioxide/carbon tetrachloride, carbon dioxide/nitrogen, nitrogen/carbon tetrachloride, n-butane/i-butane, propylene/propane and ethylene/ethane. According to yet another embodiment, in the case of the separation of olefin/paraffin, the separation may be carried out at 80° C. or lower under the condition of 16 atm or less.

Hereinafter, the present disclosure will be described in more detail with reference to the following examples and the accompanying drawings. It is apparent to those skilled in the art that the following examples are for illustrative purposes only and not intended to limit the scope of the present disclosure.

[Preparation Example 1] Preparation of Polysilsesquioxane

A polysilsesquioxane according to an embodiment of the present disclosure, i.e., pyridine-containing ladder structured silsesquioxane (LPPyr64) is prepared by the method described hereinafter.

First, as trialkoxy mixed monomers, phenyltrimethoxy silane (0.24 mol) and 2-pyridylethyl trimethoxysilane (0.16 mol) are provided, and HPLC-grade tetrahydrofuran (40 g) and distilled water (24 g) are provided to obtain a hydrous mixed solvent. In addition, potassium carbonate (0.2 g) is dissolved in the provided distilled water as catalyst and agitated homogeneously with tetrahydrofuran for 20 minutes.

Next, the above solution of mixed monomers including phenyltrimethoxy silane (0.24 mol) and 2-pyridylethyl trimethoxysilane (0.16 mol) is added dropwise to the hydrous solution, followed by agitation. After addition of the monomer mixture, reaction is carried out at 25° C. for 3 days. The product was purified by extraction of the resinous solids through extraction with water immiscible organic solvents capable of dissolving polysilsesquioxane-based materials, for example, chloroform, methylene chloride, toluene and xylene.

Figure 2:
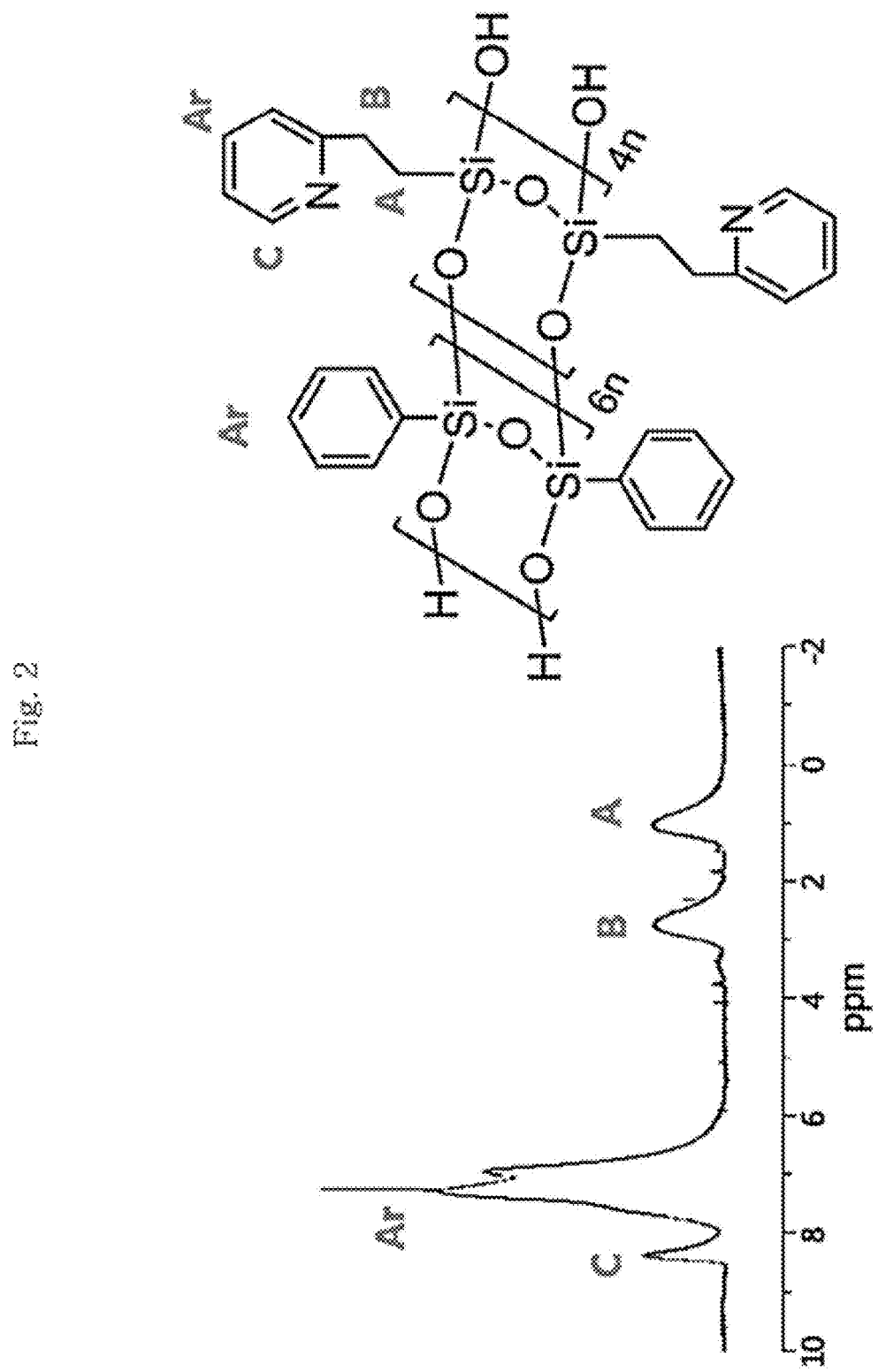
FIG. 2 shows the $^1H$ NMR analysis results of a pyridine-containing ladder-structured silsesquioxane (LPPyr64).
Figure 3:
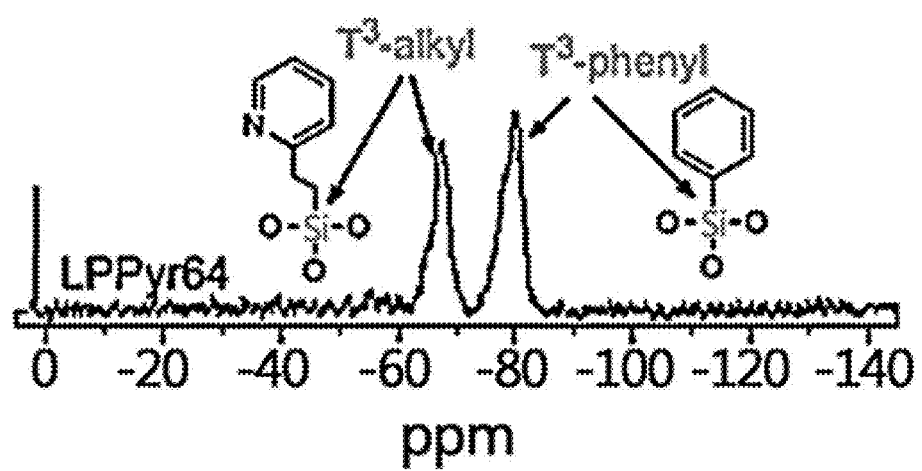
FIG. 3 shows the $^{29}Si$ NMR analysis results of a pyridine-containing ladder-structured silsesquioxane (LPPyr64).

The obtained pyridine-containing ladder structured silsesquioxane (LPPyr64) is analyzed for its structure through $^1$H NMR and $^{29}$Si NMR spectrometry, and the results are shown in FIG. 2 and FIG. 3.

Mw=24,000 (polystyrene standard)
yield=96%

Another ladder structured polysilsesquioxane according to an embodiment of the present disclosure, i.e. LPMA64 may be obtained by the same method as described above, except that 3-methacryloxypropyl trimethoxysilane is used instead of 2-pyridylethyl trimethoxysilane. LPG64 may be obtained by the same method as described above, except that 3-glycidoxypropyl trimethoxysilane is used instead of 2-pyridylethyl trimethoxysilane.

[Preparation Example 2] Preparation of Polymer Membrane and Composition for Use in Fabricating Carbon Molecular Sieve Membrane A composition for use in fabricating a carbon molecular sieve membrane according to an embodiment is prepared according to the following method.

First, 6FDA-DAM:DABA (3:2) (PI) (Akron Polymer Systems, USA) as fluorine-containing polymer matrix and Preparation Example 1 (LPPyr64) as ladder structured polysilsesquioxane (LPSQ) are introduced to and dissolved in tetrahydrofuran (THF (>99.0% purity, Dae Jung, Korea) as solvent according to the composition as shown in the following Table 1.

TABLE 1

| Sample | Unit | 6FDA-DAM:DABA (3:2) | LPSQ | THF | Total |
|---|---|---|---|---|---|
| 6FDA-DAM:DABA (3:2) (Comp. Ex. 1) | Wt % | 5.0 | 0.0 | 95.0 | 100.0 |
| 6FDA-DAM:DABA (3:2)/LPPyr64 (90/10 wt/wt) (Ex. 1) | Wt % | 4.5 | 0.5 | 95.0 | 100.0 |
| 6FDA-DAM:DABA (3:2)/LPPyr64 (80/20 wt/wt) (Ex. 2) | Wt % | 4.0 | 1.0 | 95.0 | 100.0 |

To accomplish complete dissolution, the materials are mixed through a roller for at least 12 hours and the residual impurities in the homogeneously dissolved polymer solution are removed by cotton in a syringe. Filming is carried out by a melting and casting process on a Teflon dish with a Teflon casting ring. To allow gradual evaporation of the solvent, the melting and casting process is carried out in a glove bag saturated with THF. After 12 hours, the vitrified film is dried under vacuum at 120° C. for 12 hours to remove the residual solvent. The dried film is cut into a circular shape, when a sharp die cutter is smashed with a hammer to reduce cutting stress. The obtained film has a uniform thickness of 80±10 μm.

[Preparation Example 3] Fabrication of Carbon Molecular Sieve Membrane

The polymer membrane obtained according to Preparation Example 2 is carbonized through a pyrolysis device to obtain a carbon molecular sieve membrane.

Figure 4:
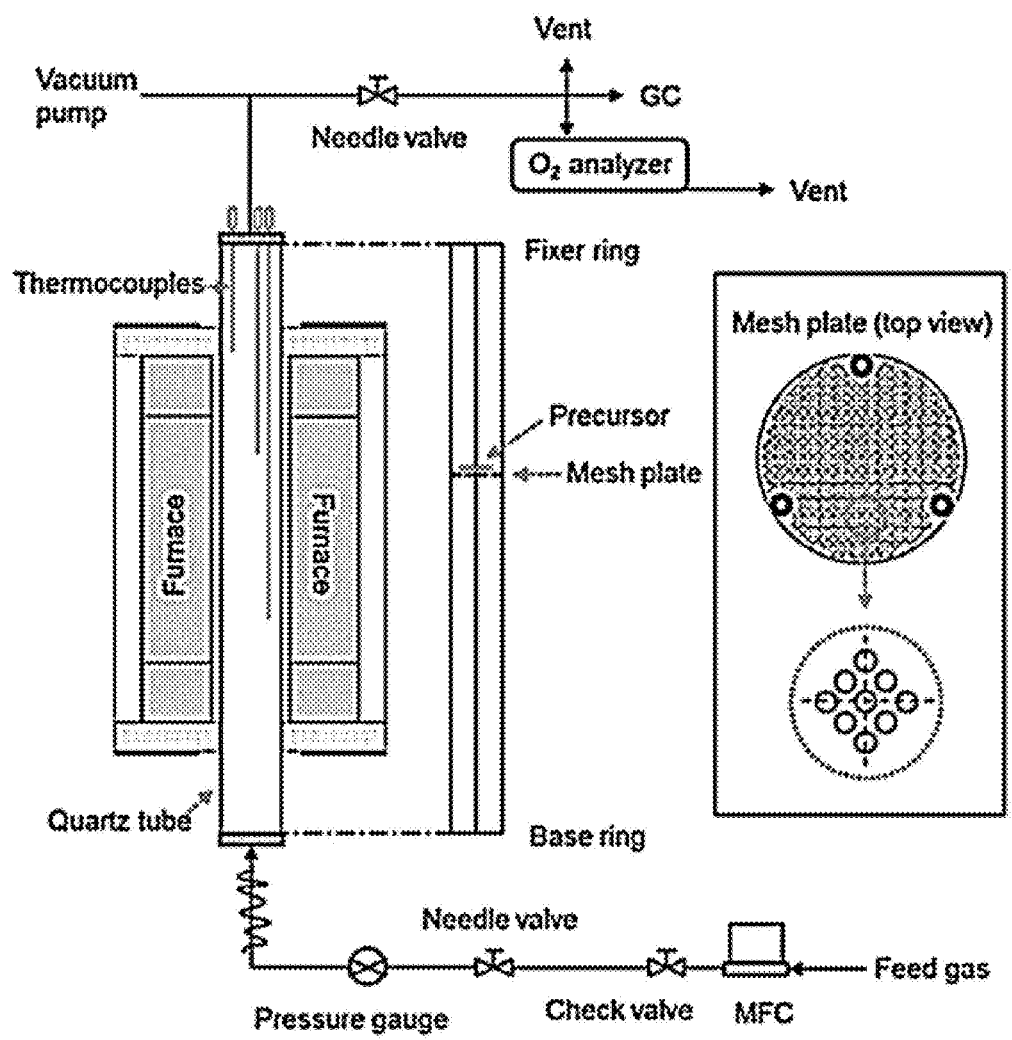
FIG. 4 shows a setup of pyrolysis system for carbonization of a polymer membrane.

Particularly, the polymer membrane according to Preparation Example 2 is disposed on a stainless steel mesh plate (Ecosolution, Korea), and then is disposed at the center of a quartz tube (MTI, USA), followed by fixing with three stainless steel poles. FIG. 4 shows a setup of pyrolysis system for carbonization of a polymer membrane. To control the temperature in the quartz tube precisely and uniformly, a three-zone furnace (Thermocraft, USA) and three separate thermometers are used with a seven-zone thermocontroller (Omega, USA) connected thereto. Both ends of the quartz tube are sealed by assembling a metal flange with a silicone O-ring. During the pyrolysis, the inner part of the quartz tube is made to be under ultrahigh-purity argon atmosphere by allowing ultrahigh-purity argon to flow through a mass flow controller (MKP, Korea) at a flow rate of 1500 cm$^3$/min. This is observed by using an oxygen analyzer (Cambridge seosotec Ltd., UK). The temperature condition is the same as shown in the pyrolysis temperature protocol of Table 2. Particularly, heating is carried out at a rate of 13.3° C./min from 50° C. to 250° C., and then at a rate of 3.85° C./min from 250° C. to 660° C. To control the temperature precisely, heating is carried out gradually at a rate of 0.25° C./min from 660° C. to 675° C., and the isothermal condition is maintained at 675° C. for 2 hours, and then cooling is carried out gradually to room temperature.

TABLE 2

| Initial Temperature (° C.) | Final Temperature (° C.) | Ramp Rate (° C./min) |
|---|---|---|
| 50 | 250 | 13.3 |
| 250 | 660 | 3.85 |
| 660 | 675 | 0.25 |
| 675 | 675 | Soak for 2 hours |

After pyrolysis, the quartz tube and mesh plate are heated again at 800° C. under air atmosphere and the residual materials are removed by using sand paper, followed by washing with acetone.

Figure 5:
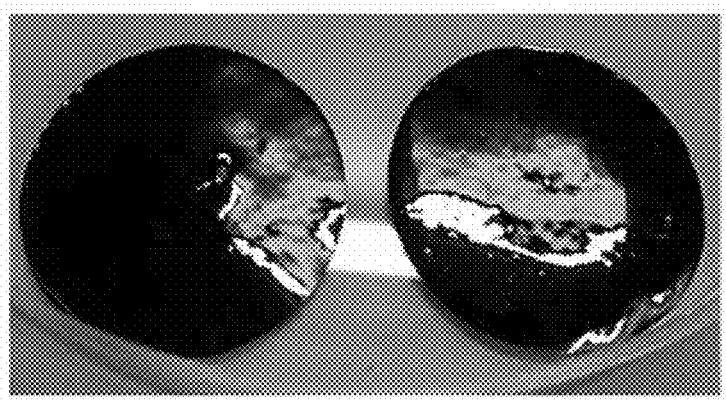
FIG. 5 is a photograph illustrating the carbon molecular sieve membrane obtained by using 6FDA-DAM:DABA (3:2)/LPSQ (90/10 wt/wt) as precursor.

FIG. 5 is a photograph illustrating the carbon molecular sieve membrane (Example 1) obtained by using 6FDA-DAM:DABA (3:2)/LPSQ (90/10 wt/wt) as precursor according to Preparation Example 2.

[Test Example 1] Binding Structure of Fluorine-Containing Polymer Matrix with Polysilsesquioxane To analyze the bonding structure of the fluorine-containing polymer matrix with polysilsesquioxane in the composition for use in fabricating a carbon molecular sieve membrane according to an embodiment, the following test is carried out.

First, 6FDA-DAM:DABA (3:2) (PI) (Akron Polymer Systems, USA) as fluorine-containing polymer matrix, and LPPyr64, LPMA64 and LPG64 as ladder structured polysilsesquioxanes (LPSQ) are prepared according to Preparation example 1. Then, the fluorine-containing polymer matrix is blended with each ladder structured polysilsesquioxane at a weight ratio of 90:10 and the resultant blend is dissolved in an organic solvent in the same manner as Preparation Example 2 to obtain a polymer membrane (Example 1, Example 3 and Example 4).

To observe the section of each blend in the membrane, the blend is cut under liquid nitrogen, and the section is coated with platinum and observed by Field Emission Gun Scanning Electron Microscopy (FEG-SEM) (Inspect F (FEW at 10 kV.

Figure 6:
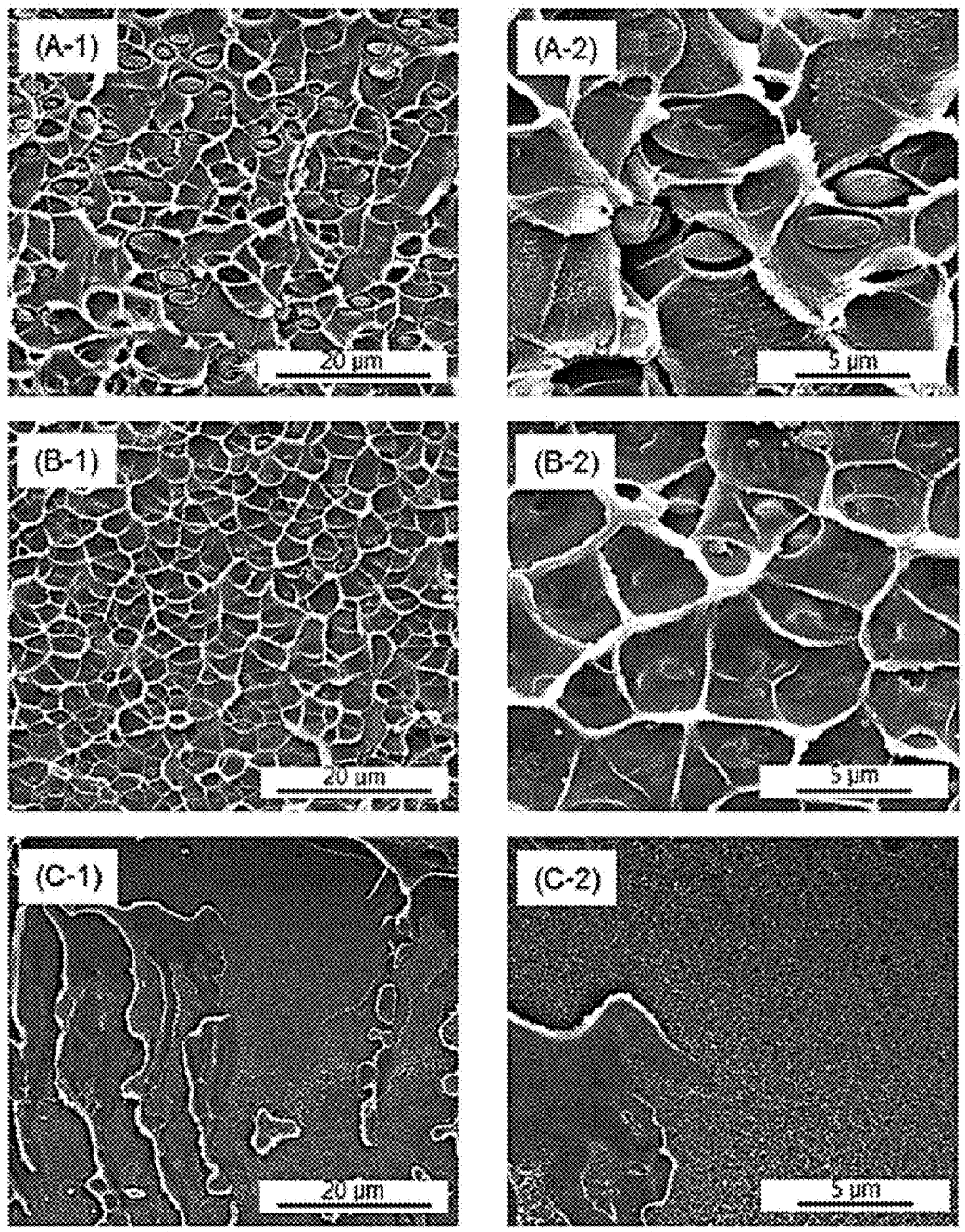
FIG. 6 is a scanning electron microscopic (SEM) image illustrating the polymer membrane obtained from a composition for use in fabricating a carbon molecular sieve membrane, wherein the photographs at the left side are taken at a low resolution and the photographs at the right side are taken at a high resolution, and (A-1) and (A-2) correspond to 6FDA-DAM:DABA (3:2)/LPMA64 (90/10 wt/wt), (B-1) and (B-2) correspond to 6FDA-DAM:DABA (3:2)/LPG64 (90/10 wt/wt), and (C-1) and (C-2) correspond to 6FDA-DAM:DABA (3:2)/LPPyr64 (90/10 wt/wt).

FIG. 6 is a scanning electron microscopic (SEM) image illustrating the polymer membrane obtained from a composition for use in fabricating a carbon molecular sieve membrane, wherein the photographs at the left side are taken at a low resolution and the photographs at the right side are taken at a high resolution. For example, as can be seen from (C-1) and (C-2), hydrogen bonding is formed between the carboxylic acid of DABA portion in 6FDA-DAM:DABA (3:2) and pyridine of LPPyr64 in the case of 6FDA-DAM:DABA (3:2)/LPPyr64 (90/10 wt/wt), thereby forming a structure close to a single phase.

[Test Example 2] Interaction and Chemical Structures of Fluorine-Containing Polymer Matrix and Polysilsesquioxane To analyze the interaction and chemical structure of the fluorine-containing polymer matrix and polysilsesquioxane in the composition for use in fabricating a carbon molecular sieve membrane according to an embodiment, 6FDA-DAM:DABA (3:2) (PI: Comparative Example 1), PI/LPPyr64 (90/10 wt/wt) (Example 1), PI/LPPyr64 (80/20 wt/wt) (Example 2), PI/LPMA64 (90/10 wt/wt) (Example 3) and PI/LPG64 (90/10 wt/wt) (Example 4) in the form of polymer membranes are prepared. Then, the interaction between 6FDA-DAM:DABA (3:2) and each of LPPyr64, LPMA64 and LPG64 is observed by using Fourier Transfer Infrared Spectroscopy (FT-IR) (FT-IR frontier, Perkin-Elmer).

Figure 7A:
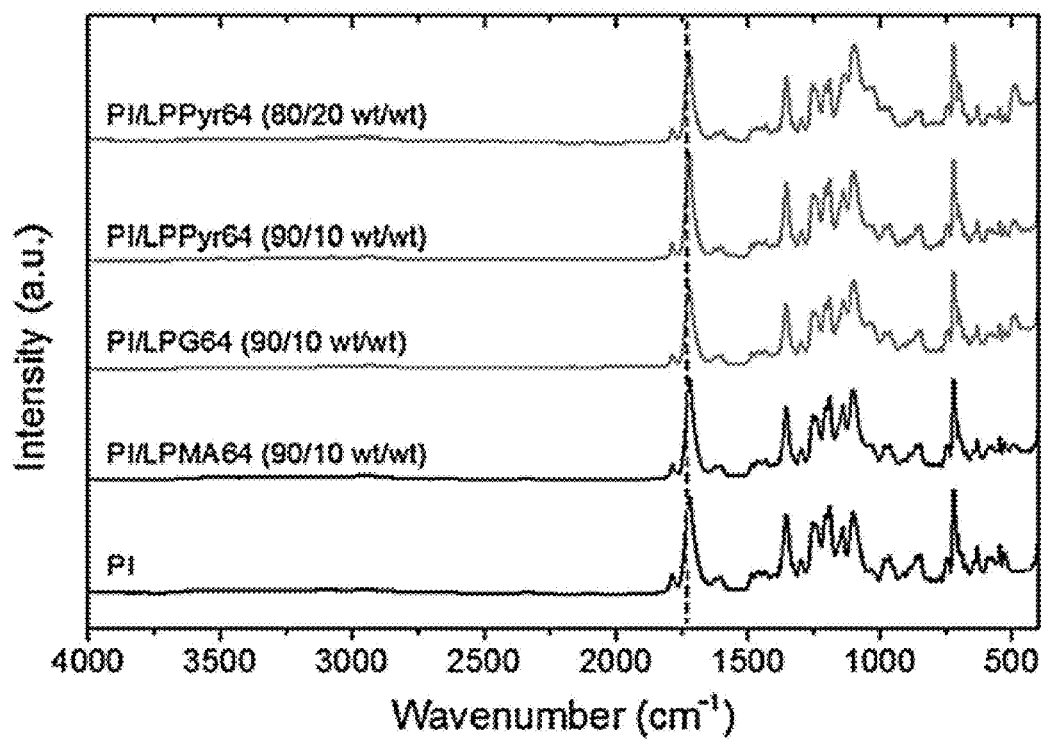
FIG. 7A and FIG. 7B show the Fourier Transform Infrared (FT-IR) Spectrum of each of the polymer membranes obtained from the compositions for use in fabricating carbon molecular sieve membranes, 6FDA-DAM:DABA (3:2) (PI), 6FDA-DAM:DABA (3:2) (PI)/LPPyr64 (80/20 wt/wt), 6FDA-DAM:DABA (3:2) (PI)/LPPyr64 (90/10 wt/wt), 6FDA-DAM:DABA (3:2) (PI)/LPG64 (90/10 wt/wt) and 6FDA-DAM:DABA (3:2) (PI)/LPMA64 (90/10 wt/wt).
Figure 7B:
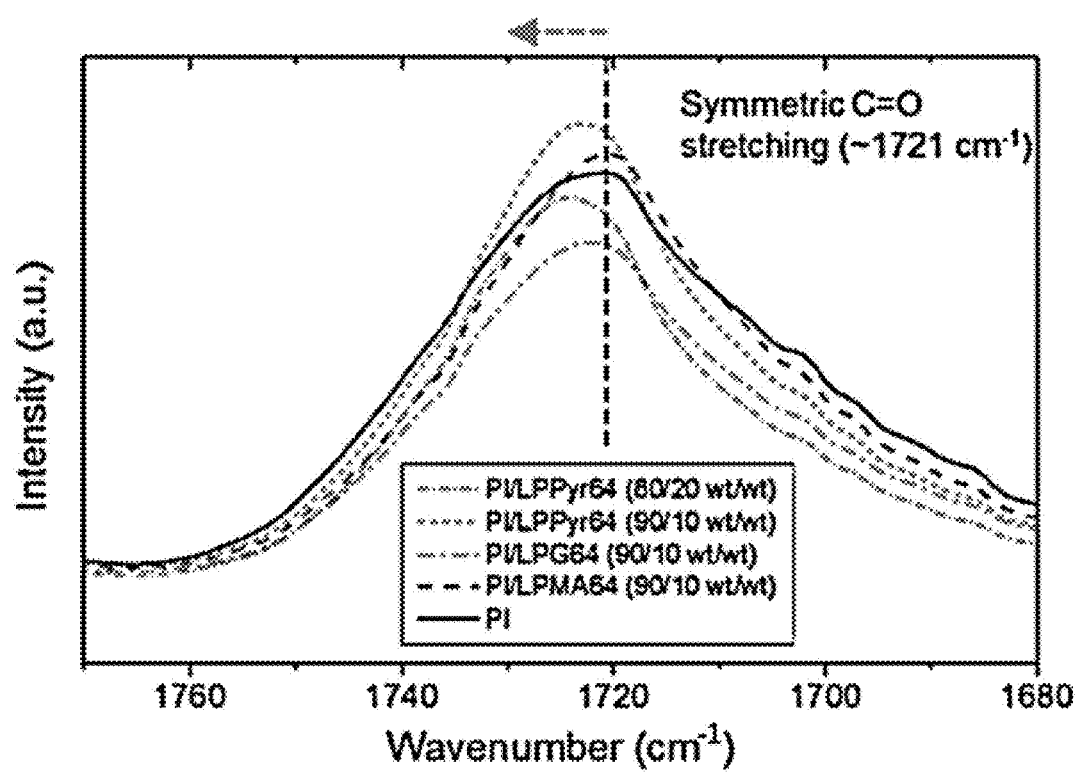

FIGS. 7A and 7B show the FT-IR Spectrum of each of 6FDA-DAM:DABA (3:2) (PI) and a blend of 6FDA-DAM:DABA (3:2) (PI) with LPSQ. According to the results of FT-IR determination, the blend of 6FDA-DAM:DABA (3:2) (PI) with LPSQ forms a strong hydrogen bonding, and thus the C=O stretching peak of carboxylic acid shifts toward a higher wavenumber.

Figure 8:
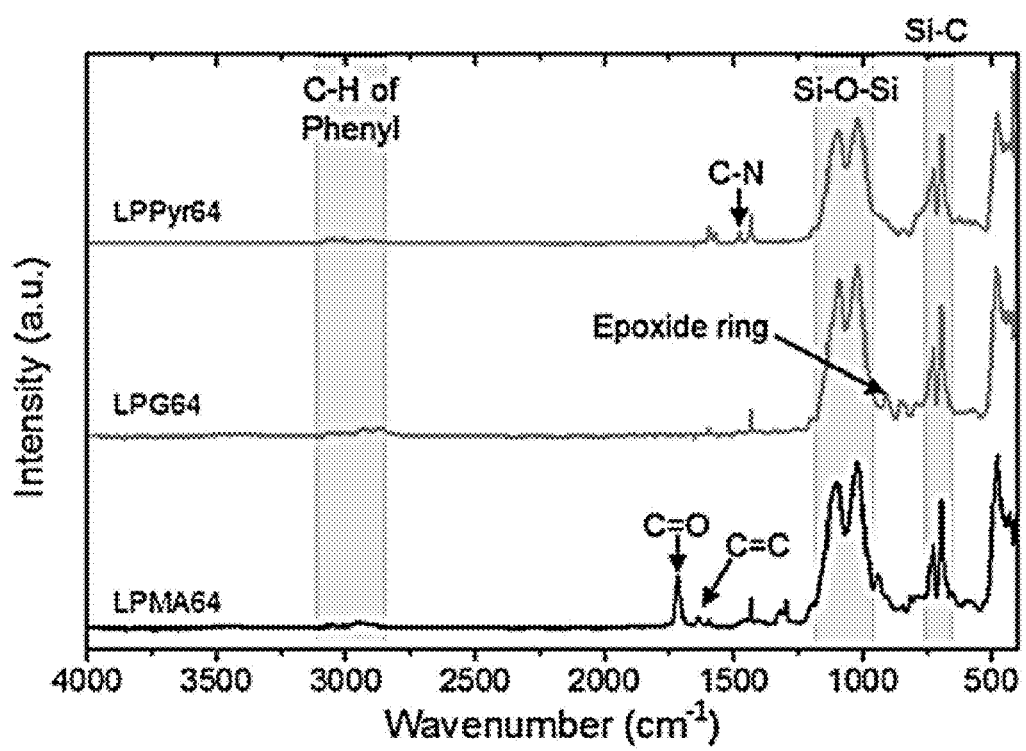
FIG. 8 shows the chemical structures of ladder-structured polysilsesquioxane having a different organic functional group, as determined by FT-IR.

FIG. 8 shows the chemical structures of ladder-structured polysilsesquioxane having a different organic functional group, as determined by FT-IR.

[Test Example 3] Pyrolysis Behavior of Composition for Use in Fabricating Carbon Molecular Sieve Membrane 1

To determine the pyrolysis behavior of the composition for use in fabricating a carbon molecular sieve membrane including a fluorine-containing polymer matrix and polysilsesquioxane according to an embodiment, thermogravimetric analysis (TGA) is carried out by using TGA1 (METTLER TOLEDO).

First, 6FDA-DAM:DABA (3:2) (PI: Comparative Example 1), PI/LPPyr64 (90/10 wt/wt) (Example 1), PI/LPPyr64 (80/20 wt/wt) (Example 2), LPPyr64 (Comparative Example 2) in the form of polymer membranes (precursors) are prepared, and then treated under the same condition of pyrolysis for fabricating a carbon molecular sieve membrane. In other words, 10-15 mg of each sample is introduced to a ceramic fan and the inner part of a chamber is purged with ultrahigh-purity (99.9999%) argon at 50° C. with a flow rate of 50 mL/min for 30 minutes. The temperature condition is set under the same condition as shown in Table 2. Particularly, heating is carried out at a rate of 13.3° C./min from 50° C. to 250° C. and at a rate of 3.85° C./min from 250° C. to 660° C. To control the temperature precisely, heating is carried out at a rate of 0.25° C./min from 660° C. gradually to 675° C., the isothermal condition is maintained at 675° C. for 2 hours, and then cooling is carried out gradually to room temperature.

Figure 9:
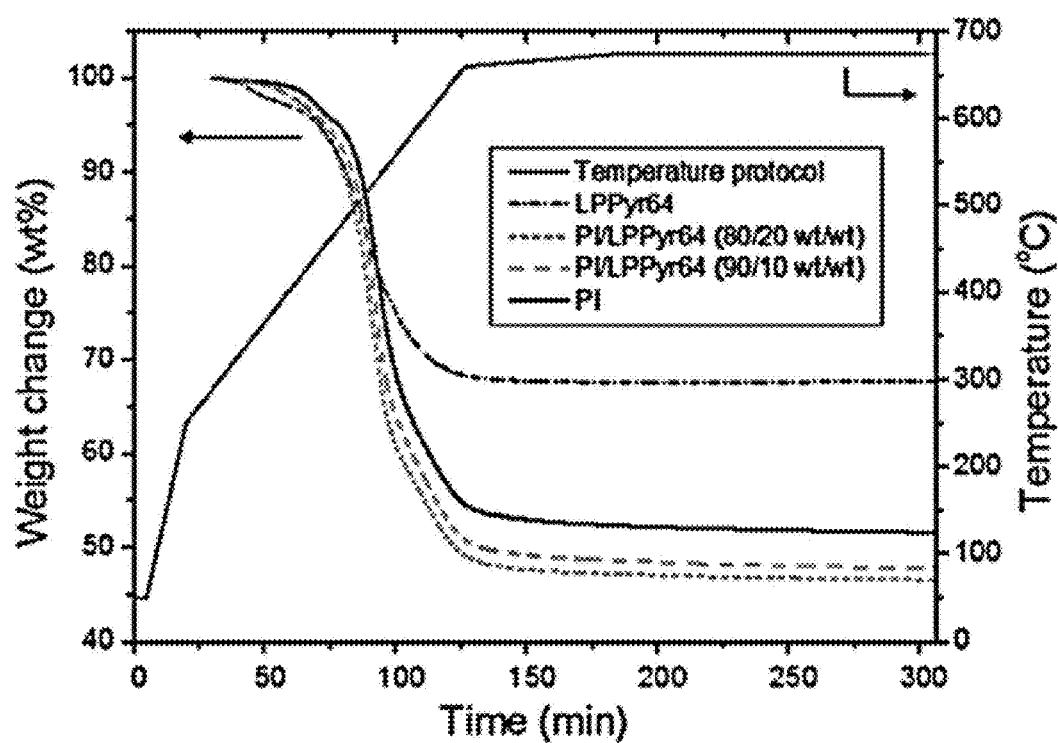
FIG. 9 shows the thermal behavior of each of the polymer membranes, 6FDA-DAM:DABA (3:2) (PI: Comparative Example 1), PI/LPPyr64 (90/10 wt/wt) (Example 1), PI/LPPyr64 (80/20 wt/wt) (Example 2) and LPPyr64 (Comparative Example 2).

As shown in FIG. 9, Comparative Example 1 and Examples 1 and 2 including 6FDA-DAM:DABA (3:2) show a gradual decrease in weight at around 350° C. It is thought that this results from the generation of carbon dioxide caused by decarboxylation of DABA portion. In addition, in Comparative Example 1 and Examples 1 and 2, a rapid decrease in weight occurs at around 450° C. and such a decrease becomes gradual at 650° C. or higher.

Particularly, Examples 1 and 2 according to the present disclosure show a larger decrease in weight as compared to Comparative Examples 1 and 2 including either a fluorine-containing polymer matrix or a ladder structured polysilsesquioxane. It is thought that this is because an additional decrease in weight occurs due to the silica chemical moieties etched by the etching gas (e.g. HF or $CHF_3$) generated during the pyrolysis. In other words, Examples 1 and 2 according to the present disclosure provide carbon molecular sieve membranes by using a composition including a fluorine-containing polymer matrix and polysilsesquioxane, and thus have a larger number of ultramicropores as compared to the composition including only one of the two materials, thereby providing improved gas separation quality.

[Test Example 4] Pyrolysis Behavior of Composition for Use in Fabricating Carbon Molecular Sieve Membrane 2

To analyze the results of Test Example 3 more clearly, the following elemental analysis (EA) is carried out.

To determine the contents of carbon, hydrogen and nitrogen, an elemental analyzer (EA, FLASH 2000 CHN/CHNS Automatic elemental Analyzer (Thermo scientific)) is used and the weight ratio of oxygen is observed through 1108 CHNS-O (FISONS Instruments). Ion chromatography is used to determine fluorine content. Finally, the weight ratio of silicon is determined by total dissolution technique using Inductively Coupled Plasma Optical Emission Spectrometry (ICP-OES, i-CAP 6000 series (Thermo)).

The following Table 3 shows the elemental analysis results of 6FDA-DAM:DABA (3:2) (PI: Comparative Example 1), PI/LPPyr64(90/10 wt/wt) (Example 1), PI/LPPyr64 (80/20 wt/wt) (Example 2), before pyrolysis. Table 4 shows the results of the carbon molecular sieve membranes, after pyrolysis.

TABLE 3

| | Element (wt %) | | | | | |
|---|---|---|---|---|---|---|
| | C | H | N | O | F | Si |
| PI (Comp. Ex. 1) | 52.71 | 2.33 | 4.35 | 16.31 | 24.30 | 0.00 |
| PI/LPPyr64 (90/10 wt/wt) (Ex. 1) | 52.42 | 2.60 | 4.45 | 15.55 | 24.23 | 0.75 |
| PI/LPPyr64 (80/20 wt/wt) (Ex. 2) | 51.49 | 2.90 | 4.50 | 14.95 | 24.17 | 2.00 |

TABLE 4

| | Element (wt %) | | | | | |
|---|---|---|---|---|---|---|
| | C | H | N | O | F | Si |
| CMS_PI (Carbon molecular sieve membrane of Comp. Ex. 1) | 79.52 | 2.95 | 5.45 | 12.08 | 0.00 | 0.00 |
| CMS_PI/LPPyr64 (90/10 wt/wt) (Carbon molecular sieve membrane of Ex. 1) | 78.85 | 1.97 | 5.75 | 13.40 | 0.00 | 0.03 |
| CMS_PI/LPPyr64 (80/20 wt/wt) (Carbon molecular sieve membrane of Ex. 2) | 77.04 | 0.35 | 7.04 | 14.92 | 0.00 | 0.65 |

As shown in Tables 3 and 4, Example 1 shows a decrease in silicon element content from 0.75 to 0.03 and Example 2 shows a decrease in silicon element content from 2.00 to 0.65. This demonstrates that the carbon molecular sieve membranes of Examples 1 and 2 according to the present disclosure show a significantly smaller decrease in silicon element content as compared to the corresponding polymer membranes (precursors).

[Test Example 5] Crystallinity and Chain Packing of Composition for Use in Fabricating Carbon Molecular Sieve Membrane and Carbon Molecular Sieve Membrane Using the Same The following test is carried out to determine the crystallinity and chain packing of the composition for use in fabricating a carbon molecular sieve membrane including a fluorine-containing polymer matrix and polysilsesquioxane according to an embodiment and the carbon molecular sieve membrane including the same.

CuK$_\alpha$ radiation ($\lambda$=1.5406 Å) is used to determine the crystallinity and chain packing through wide angle X-ray diffraction (WAXD, Dmax2500/PC (Rigaku)). Herein, d-spacing values are calculated by the Bragg's law (d=$\lambda$/2 sin θ), and 2θ is measured from 5-50°.

Figure 10:
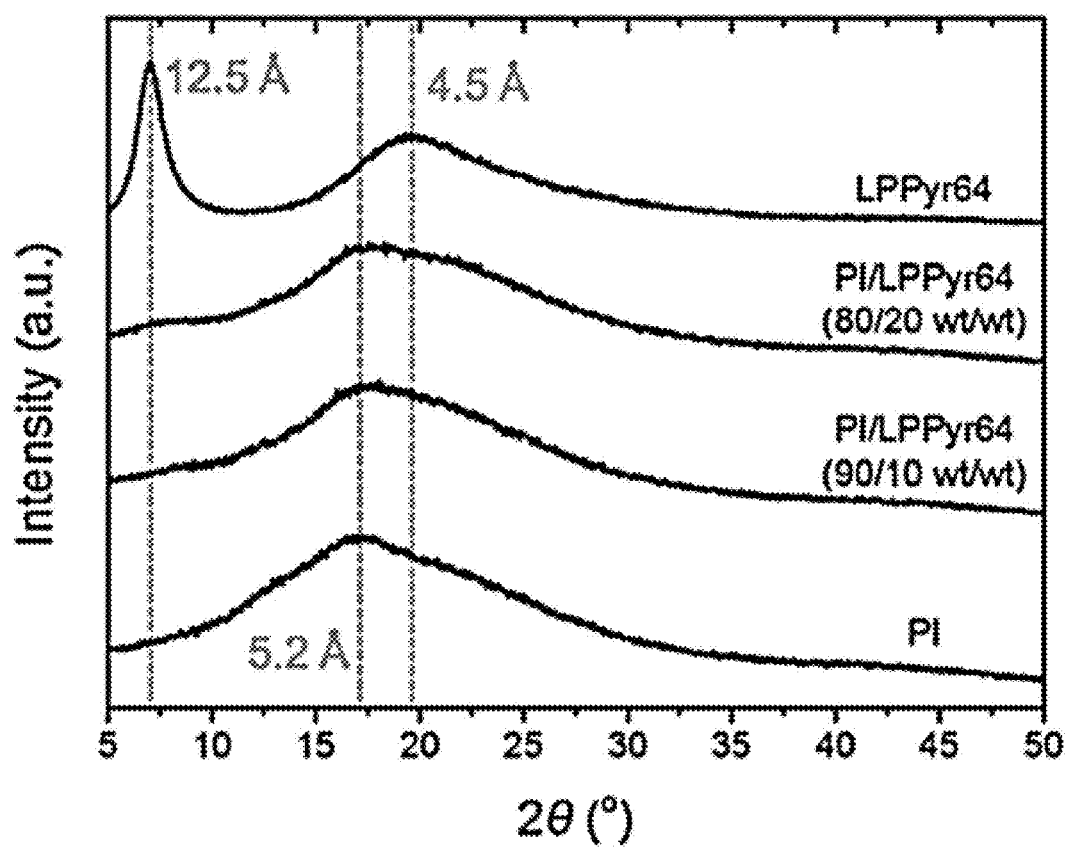
FIG. 10 shows the wide-angle X-ray diffraction (WAXD) patterns of the polymer membrane precursors, 6FDA-DAM: DABA (3:2) (PI), PI/LPPyr64 (90/10 wt/wt), PI/LPPyr64 (80/20 wt/wt) and LPPyr64, before pyrolysis.

After the test, as shown in FIG. 10, before pyrolysis, 6FDA-DAM:DABA (3:2) (PI: Comparative Example 1), PI/LPPyr64 (90/10 wt/wt) (Example 1), PI/LPPyr64 (80/20 wt/wt) (Example 2) and LPPyr64 (Comparative Example 2) polymer membranes (precursors) show little change in d-spacing depending on polymer content. In the case of LPPyr64 (Comparative Example 2), the specific interchain distance and intrachain distance of the ladder structured polysilsesquioxane appear at 7.3° and 19.5°, respectively.

Figure 11:
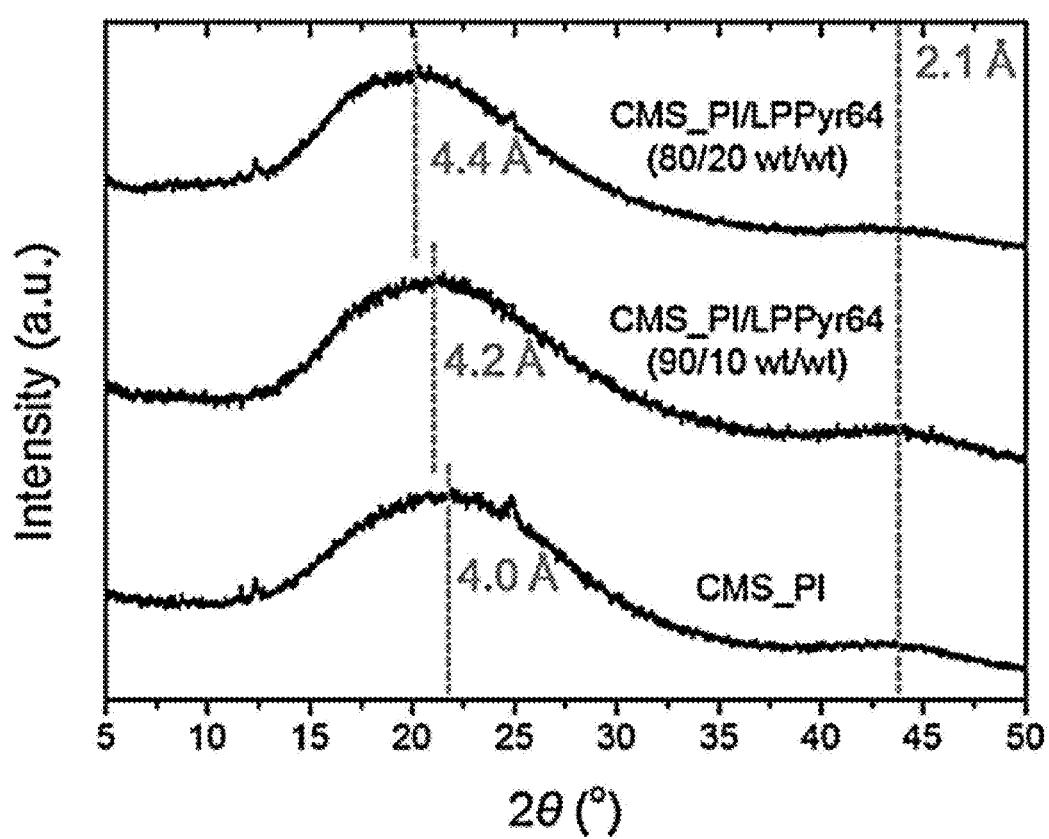
FIG. 11 shows the WAXD patterns of the carbon molecular sieve (CMS) membranes, 6FDA-DAM:DABA (3:2) (PI), PI/LPPyr64 (90/10 wt/wt), PI/LPPyr64 (80/20 wt/wt) and LPPyr64.

Meanwhile, in the case of carbon molecular sieve membranes, as shown in FIG. 11, the average d-spacing value of a carbon molecular sieve increases as the content of LPPyr64 is increased. It is thought that this is because LPPyr64 interrupts chain packing during carbonization.

[Test Example 6] Analysis of Carbon Molecular Sieve Membrane

Figure 12:
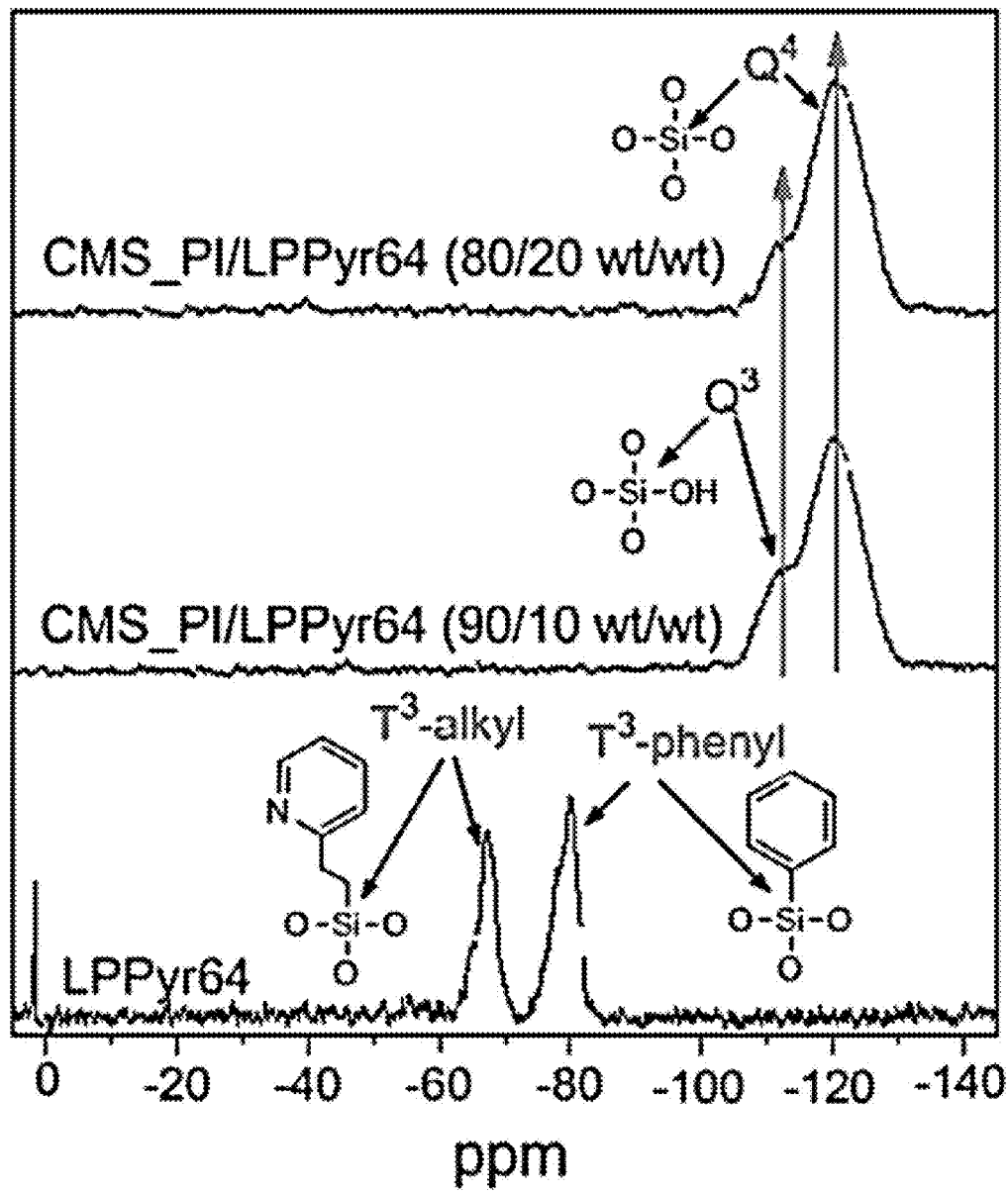
FIG. 12 shows the $^{29}Si$ NMR analysis results of the carbon molecular sieve membranes obtained by carbonization of PI/LPPyr64 (90/10 wt/wt), PI/LPPyr64 (80/20 wt/wt) and LPPyr64.

Each of the compositions for use in fabricating a carbon molecular sieve membrane including a fluorine-containing polymer matrix and ladder structured polysilsesquioxane according to an embodiment of the present disclosure, i.e., PI/LPPyr64 (90/10 wt/wt) (Example 1) and PI/LPPyr64 (80/20 wt/wt) (Example 2), and the polymer membrane, LPPyr64 (Comparative Example 2) is carbonized to obtain a carbon molecular sieve membrane, which is analyzed by $^{29}$Si nuclear magnetic resonance (NMR) spectrometry. The results are shown in FIG. 12.

Figure 13:
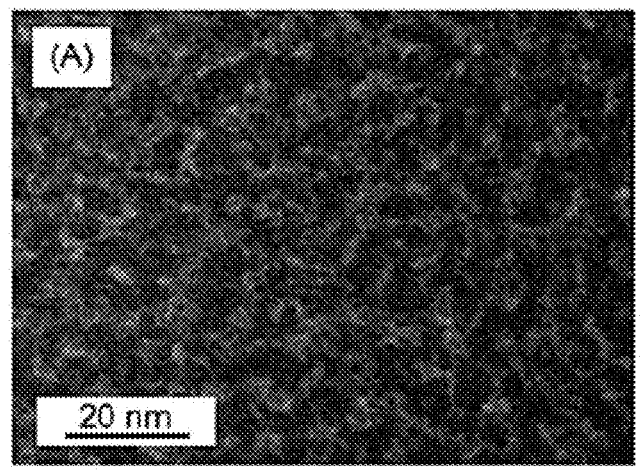
FIG. 13 shows the scanning transmission electron microscopic (STEM) images of the carbon molecular sieve (CMS) membranes obtained by carbonization of (A) PI, (B) PI/LPPyr64 (90/10 wt/wt) and (C) PI/LPPyr64 (80/20 wt/wt).
Figure 13:
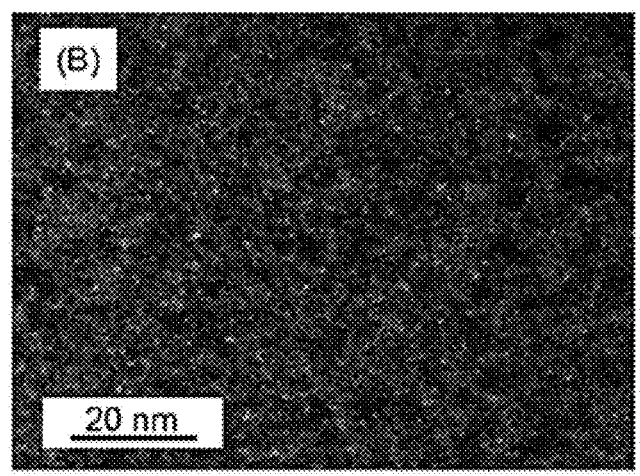
Figure 13:
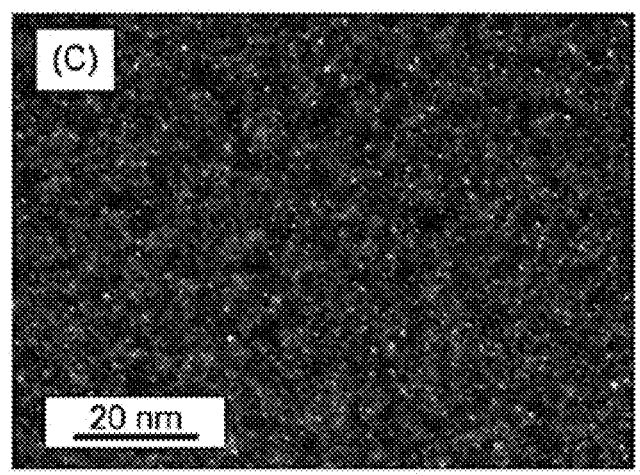

In addition, to observe the shape of the inorganic phase in the carbon molecular sieve membrane obtained by carbonizing each of 6FDA-DAM:DABA (3:2) (PI: Comparative Example 1), PI/LPPyr64 (90/10 wt/wt) (Example 1) and PI/LPPyr64 (80/20 wt/wt) (Example 2), the image is taken by scanning transmission electron microscopy (STEM) and shown in FIG. 13. The electron beams have an accelerated voltage of 300 KeV and the scanning electron beams have a size of about 0.1 nm. In FIG. 13, (A) corresponds to the STEM image of CMS_PI, (B) corresponds to that of CMS_PI/LPPyr64 (90/10 wt/wt) and (C) corresponds to that of CMS_PI/LPPyr64 (80/20 wt/wt).

[Test Example 7] Gas Permeability and Selectivity of Carbon Molecular Sieve Membrane To analyze the gas permeability and selectivity of a carbon molecular sieve membrane, each of 6FDA-DAM:DABA (3:2) (PI: Comparative Example 1), PI/LPPyr64 (90/10 wt/wt) (Example 1) and PI/LPPyr64 (80/20 wt/wt) (Example 2) is carbonized at 675° C. to obtain a carbon molecular sieve (CMS) membrane. Then, the permeability of each CMS membrane to a single gas selected from $CO_2$, $N_2$, $CH_4$, $C_3H_6$ and $C_3H_8$ is measured at 35° C. under 1 atm. The results are shown in the following Table 5.

Figure 14A:
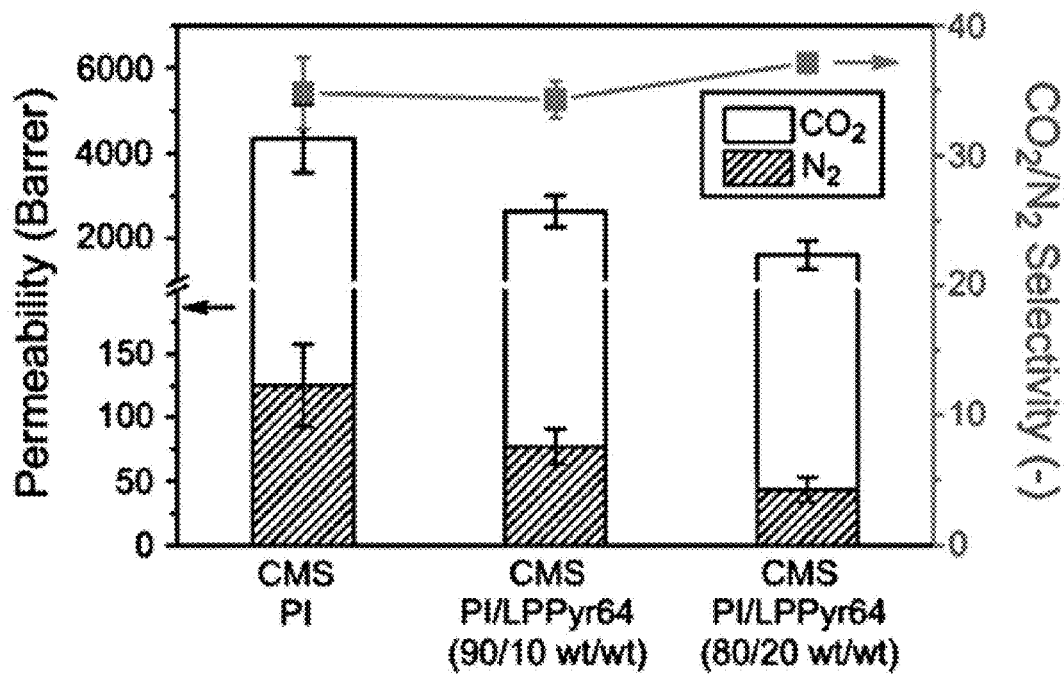
FIG. 14A is a graph illustrating the gas permeability and selectivity for $CO_2/N_2$ of the carbon molecular sieve (CMS) membranes, after carbonization of 6FDA-DAM:DABA (3:2) (LPSQ concentration 0%), PI/LPPyr64 (90/10 wt/wt) (LPSQ concentration 10%) and PI/LPPyr64 (80/20 wt/wt) (LPSQ concentration 20%).
Figure 14B:
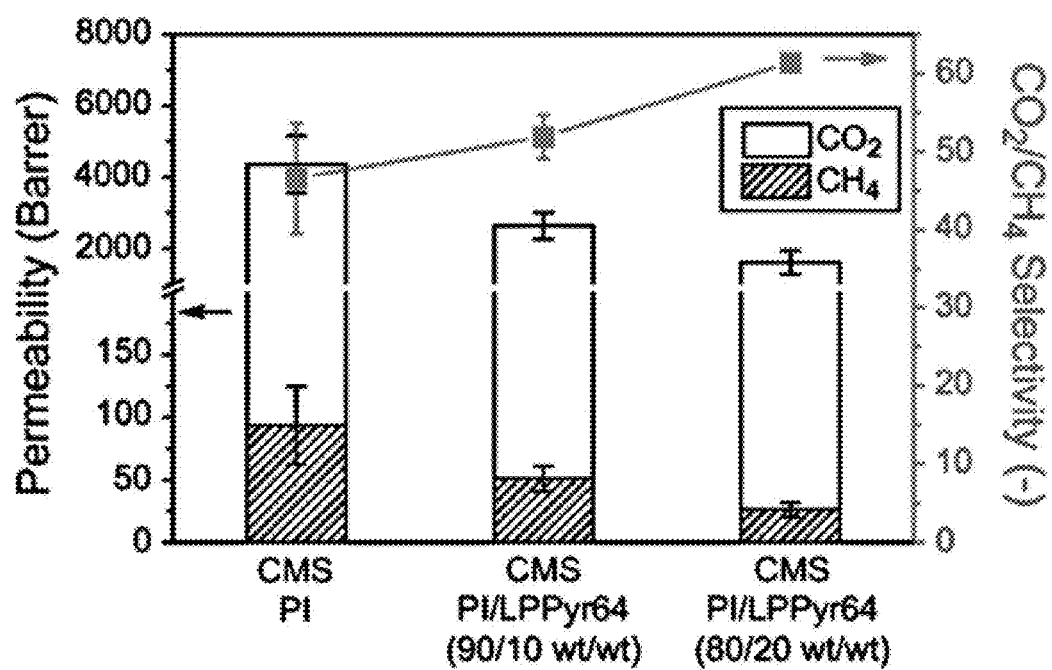
FIG. 14B is a graph illustrating the gas permeability and selectivity for $CO_2/CH_4$ of the carbon molecular sieve (CMS) membranes, after carbonization of 6FDA-DAM: DABA (3:2) (LPSQ concentration 0%), PI/LPPyr64 (90/10 wt/wt) (LPSQ concentration 10%) and PI/LPPyr64 (80/20 wt/wt) (LPSQ concentration 20%).
Figure 14C:
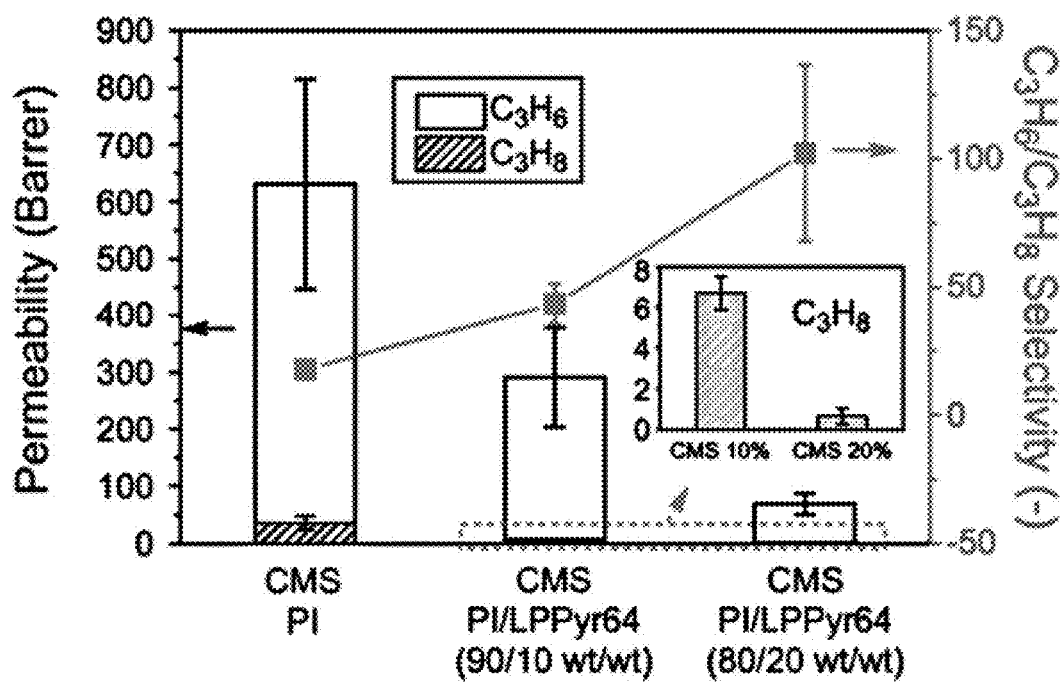
FIG. 14C is a graph illustrating the gas permeability and selectivity for $C_3H_6/C_3H_8$ of the carbon molecular sieve (CMS) membranes, after carbonization of 6FDA-DAM: DABA (3:2) (LPSQ concentration 0%), PI/LPPyr64 (90/10 wt/wt) (LPSQ concentration 10%) and PI/LPPyr64 (80/20 wt/wt) (LPSQ concentration 20%).
Figure 15:
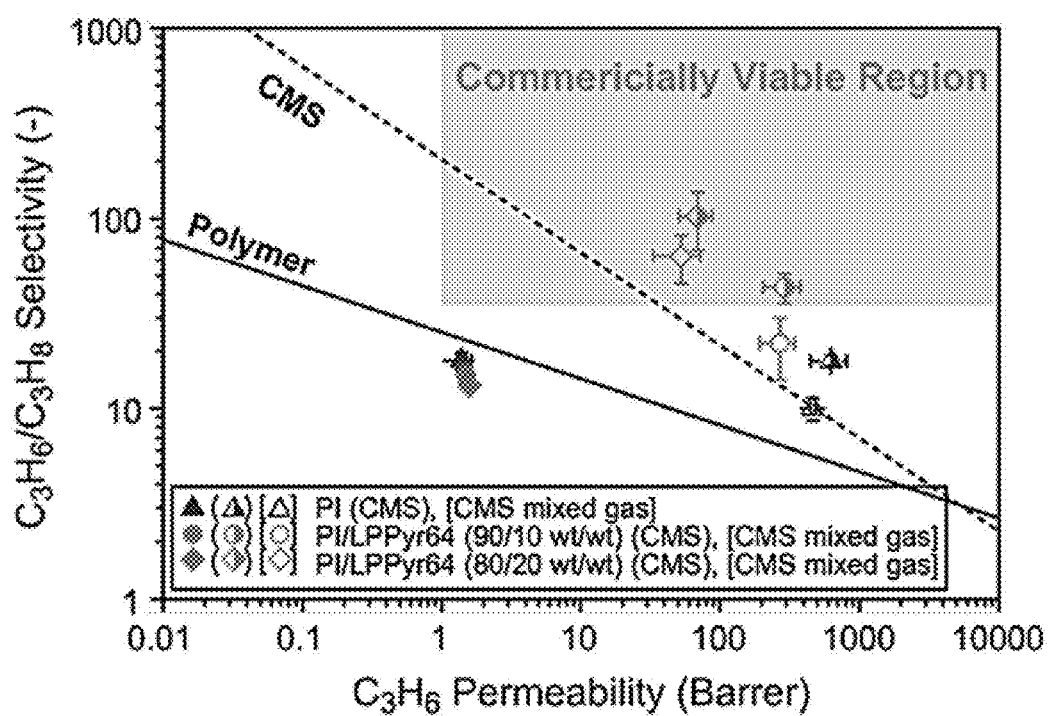
FIG. 15 is a graph illustrating the selectivity to propylene/propane ($C_3H_6/C_3H_8$) as a function of propylene ($C_3H_6$) permeability, before carbonization (polymer upper bound) and after carbonization (CMS upper bound) of 6FDA-DAM: DABA (3:2) (LPSQ concentration 0%), PI/LPPyr64 (90/10 wt/wt) (LPSQ concentration 10%) and PI/LPPyr64 (80/20 wt/wt) (LPSQ concentration 20%).

In addition, FIGS. 14A to 14C are graphs illustrating the gas permeability and selectivity for (A) $CO_2/N_2$, (B) $CO_2/CH_4$ and (C) $C_3H_6/C_3H_8$ of the carbon molecular sieve (CMS) membranes, after carbonization of 6FDA-DAM:DABA (3:2) (PI: Comparative Example 1), PI/LPPyr64 (90/10 wt/wt) (Example 1) and PI/LPPyr64 (80/20 wt/wt) (Example 2). FIG. 15 is a graph illustrating the selectivity to propylene/propane ($C_3H_6/C_3H_8$) as a function of propylene ($C_3H_6$) permeability before carbonization (polymer upper bound) and after carbonization (CMS upper bound) of 6FDA-DAM:DABA (3:2) (PI: Comparative Example 1), PI/LPPyr64 (90/10 wt/wt) (Example 1) and PI/LPPyr64 (80/20 wt/wt) (Example 2).

TABLE 5

|  | $CO_2$ (Barrer) | $N_2$ (Barrer) | $CH_4$ (Barrer) | $C_3H_6$ (Barrer) | $C_3H_8$ (Barrer) | $CO_2/N_2$ (—) | $CO_2/CH_4$ (—) | $C_3H_6/C_3H_8$ (—) |
|---|---|---|---|---|---|---|---|---|
| CMS_PI | 4351.18 ± 800.63 | 125.21 ± 32.61 | 93.35 ± 31.33 | 630.23 ± 184.24 | 35.47 ± 12.61 | 34.8 ± 2.7 | 46.6 ± 7.1 | 17.8 ± 1.1 |
| CMS_PI/LPPyr64 (90/10 wt/wt) | 2633.83 ± 375.53 | 76.79 ± 14.19 | 50.77 ± 9.97 | 291.11 ± 87.07 | 6.69 ± 0.81 | 34.3 ± 1.4 | 51.9 ± 2.8 | 43.5 ± 7.7 |
| CMS_PI/LPPyr64 (80/20 wt/wt) | 1606.73 ± 331.43 | 43.33 ± 9.53 | 26.15 ± 5.86 | 69.52 ± 18.62 | 0.68 ± 0.41 | 37.1 ± 0.5 | 61.4 ± 1.1 | 102.2 ± 34.3 |

After the test, it can be seen from Table 5 and FIGS. 14A to 14C and FIG. 15 that all of Comparative Example 1 and Examples 1 and 2 including 6FDA-DAM:DABA (3:2) show high gas separation quality by virtue of the micropores and ultramicropores formed during carbonization. Particularly, this is because a structure having a larger free volume is formed by decarboxylation.

In addition, Example 2 (using an increased amount of a ladder structured polysilsesquioxane (LPPyr64)) shows decreased permeability to all types of gases, as compared to Example 1. This is because the content of LPPyr 64 having a relatively smaller fractional free volume (FFV) as compared to 6FDA-DAM:DABA (3:2) is increased, the composition for use in fabricating a carbon molecular sieve membrane as precursor has a decreased fractional free volume (FFV) and the corresponding carbon molecular sieve membrane has a decreased FFV, resulting in degradation of permeation quality. On the contrary, Examples 1 and 2 show higher gas selectivity as compared to Comparative Example 1.

Meanwhile, in the case of separation of propylene/propane ($C_3H_6/C_3H_8$), Example 2 shows significantly improved quality ($C_3H_6$ (Barrer): 61.59, $C_3H_6/C_3H_8$ (–): 140.0) as compared to the conventional CMS membrane. This demonstrates that it is possible to obtain excellent separation quality (selectivity) between gases having a small difference in particle size. It is thought that this is because the etching gas (HF or $CHF_3$) generated from 6FDA during the production of a CMS membrane causes etching of the silica chemical moieties and a larger number of ultramicropores capable of separating $C_3H_6$ and $C_3H_8$ are formed.

To determine the formation of such ultramicropores, the pore distribution of a carbon molecular sieve membrane is observed as follows.

The BET (Brunauer-Emmett-Teller) method is used to measure $CO_2$ adsorption by a low-temperature $CO_2$ adsorption test (ASAP 2020 (Micromeritics)), and a carbon molecular sieve (CMS) membrane is analyzed for its pore size based on the density functional theory. The low-temperature $CO_2$ adsorption test was performed at 273.15 K under absolute pressure of 1-640 mmHg.

Figure 16:
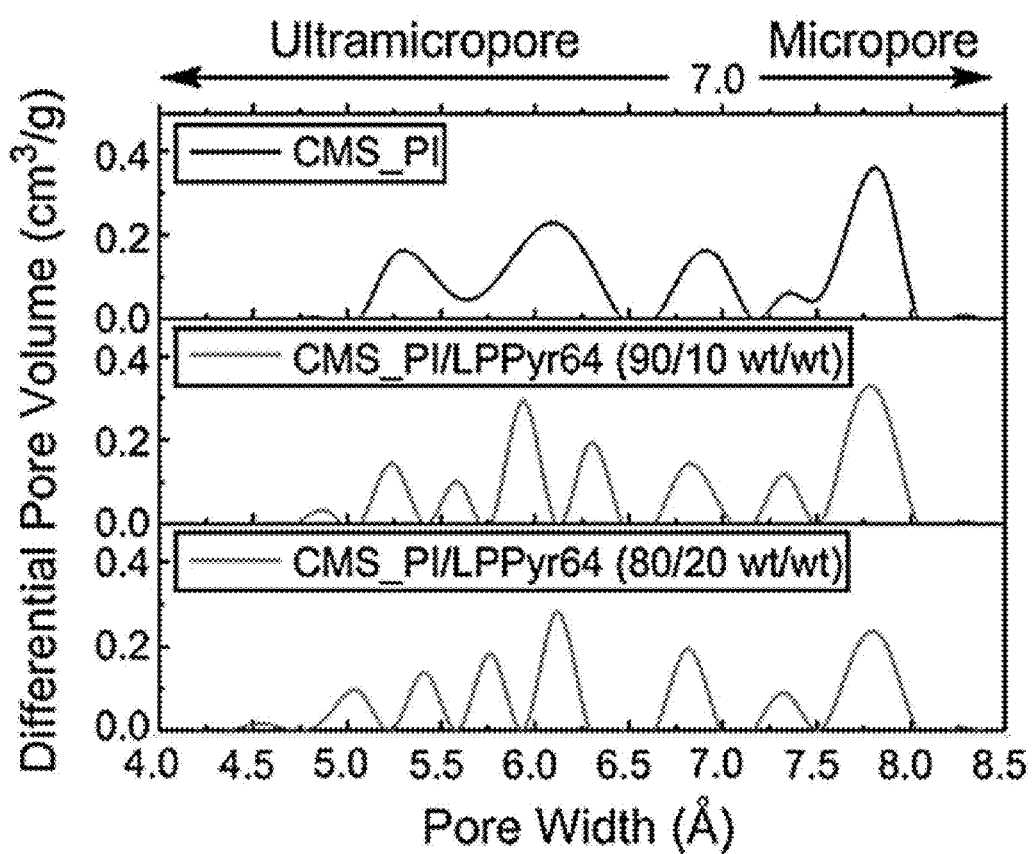
FIG. 16 is a graph illustrating the pore distribution of each of the carbon molecular sieve (CMS) membranes formed under the same pyrolysis conditions as a function of LPPyr64 content.

After the test, as shown in FIG. 16, different sizes of pores are distributed in a carbon molecular sieve separator (CMS) membrane, as the content of a ladder structured polysilsesquioxane, LPPyr64, is increased. Particularly, as the content of LPPyr64 is increased, the peaks of ultramicropores (<6 Å) are increased significantly and the peaks are more finely divided and clear. Considering that the minimum size and minimum length of propylene are smaller than those of propane (4.0 vs. 4.2 Å & 6.1 vs. 5.4 Å), it is possible to separate between $C_3H_6$ and $C_3H_8$ with high quality by virtue of entropic selectivity.

The following Table 6 shows the results of determination of the volume of total micropores (<20 Å) and that of ultramicropores (<6 Å) for the carbon molecular sieve membrane including no ladder structured polysilsesquioxane (CMS_PI), carbon molecular sieve membrane (CMS_PI/LPPyr64 (90/10 wt/wt)) including a ladder structured polysilsesquioxane in an amount of 10 wt % and carbon molecular sieve membrane (CMS_PI/LPPyr64 (80/20 wt/wt)) including a ladder structured polysilsesquioxane in an amount of 20 wt %. As shown in Table 6, as the content of the ladder structured polysilsesquioxane, LPPyr64, is increased, the ratio of the total volume of ultramicropores (<6 Å) to the total volume of micropores contained in the carbon molecular sieve (CMS) membrane is increased.

TABLE 6

|  | Total micropore volume (<20 Å) ($cm^3/g$) | Ultramicropore volume (<~7 Å) ($cm^3/g$) | Volume ratio of ultramicropores (<~7 Å) to total micropores (<20 Å) (%) |
|---|---|---|---|
| CMS_PI | 0.85 | 1.16E−02 | 1.37 |
| CMS_PI/LPPyr64 (90/10 wt/wt) | 0.68 | 1.02E−02 | 1.50 |
| CMS_PI/LPPyr64 (80/20 wt/wt) | 0.56 | 9.01E−03 | 1.61 |

[Test Example 8] Separation Quality of Carbon Molecular Sieve Membrane Depending on Organic Functional Group of Polysilsesquioxane To determine the gas permeability and selectivity of a carbon molecular sieve membrane depending on organic functional group of polysilsesquioxane used as precursor, each of 6FDA-DAM:DABA (3:2) (PI), PI/LPPyr64(80/20 wt/wt) and PI/LPG64 (80/20 wt/wt) is carbonized at 675° C. to obtain a carbon molecular sieve (CMS) membrane, which, in turn, is determined for the permeability of a single gas selected from $C_3H_6$ and $C_3H_8$ at 35° C. under 1 atm.

Figure 17A:
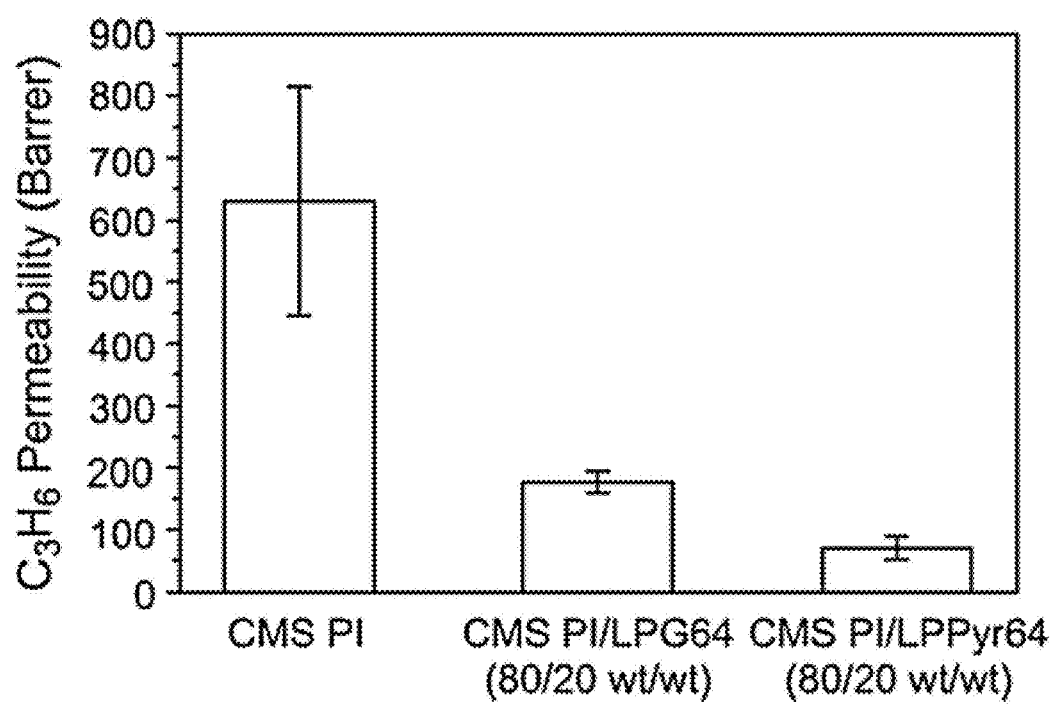
FIG. 17A is a graph illustrating the $C_3H_6/C_3H_8$ separation quality ($C_3H_6$ permeability of each carbon molecular sieve (CMS) membrane using a precursor having a different compatibility with a polymer depending on the organic functional group of polysilsesquioxane.
Figure 17B:
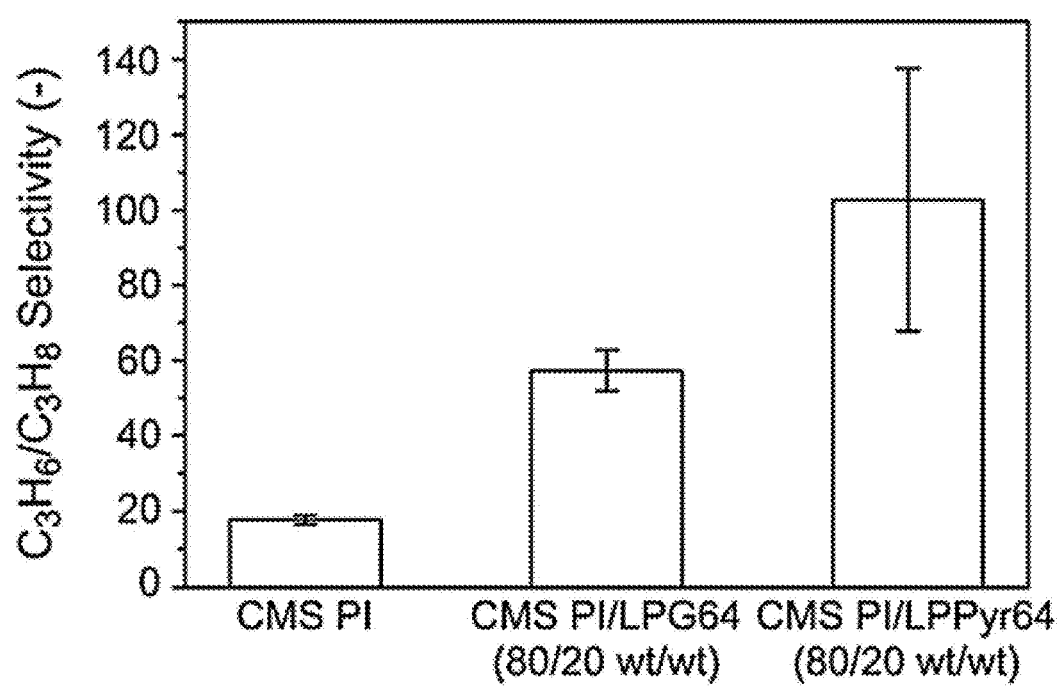
FIG. 17B is a graph illustrating the $C_3H_6/C_3H_8$ selectivity (b) of each carbon molecular sieve (CMS) membrane using a precursor having a different compatibility with a polymer depending on the organic functional group of polysilsesquioxane.

After the determination, as shown in FIGS. 17A and 17B, CMS_PI/LPG64(80/20 wt/wt), like CMS_PI/LPPyr64, shows improved $C_3H_6/C_3H_8$ selectivity and decreased $C_3H_6$ permeability, as compared to CMS_PI. In other words, it can be seen that, in the carbon molecular sieve membrane blended with LPG64, the etching effect derived from the use of fluorine gas causes a change in ultramicropore structure, similarly to the carbon molecular sieve membrane using a precursor blended with LPPyr64.

What is claimed is:
1. A carbon molecular sieve membrane, comprising carbonized product of a composition comprising: a fluorine-containing polymer matrix; and polysilsesquioxane.
2. The carbon molecular sieve membrane according to claim 1, wherein the polysilsesquioxane is a ladder-structured polysilsesquioxane represented by the following Chemical Formula 1:

[Chemical Formula 1]

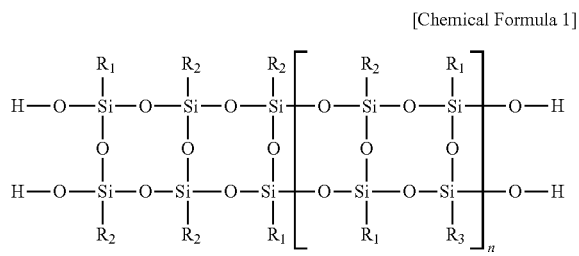

wherein each of $R_1$, $R_2$ and $R_3$ independently represents an organic functional group selected from the group consisting of aromatic phenyl, heteroaromatic phenyl, aliphatic alkyl, cycloaliphatic alkyl, vinyl, aryl, methacrylate, acrylate and epoxy groups, and n is an integer selected from 1-10,000.

3. The carbon molecular sieve membrane according to claim 1, wherein the fluorine-containing polymer matrix comprises a 2,2-bis(3,4-carboxyphenyl) hexafluoropropane dianhydride (6-FDA) based polyimide.

4. The carbon molecular sieve membrane according to claim 3, wherein the 6-FDA based polyimide comprises at least one selected from the group consisting of 6FDA-DAM (diamino-mesitylene), 6FDA-mPDA (m-phenylenediamine), 6FDA-DABA (diaminobenzoic acid), 6FDA-DETDA (diethyltolueriediamine), 6FDA:BPDA (biphenyltetracarboxylic dianhydride) (1:1)-DETDA, 6FDA-1,5 ND (1,5-diaminonapthalene):ODA (ocydianiline) (1:1), 6FDA-DETDA:DABA (3:2), 6FDA-DAM:mPDA (3:2), 6FDA-DAM:DABA (3:2) and 6FDA-mPDA:DABA (3:2).

5. The carbon molecular sieve membrane according to claim 1, wherein the polysilsesquioxane has a number average molecular weight of $10^2$-$10^8$.

6. The carbon molecular sieve membrane according to claim 2, wherein the fluorine-containing polymer matrix and the ladder structured polysilsesquioxane are bound to each other through secondary bonding, including hydrogen bonding.

7. The carbon molecular sieve membrane according to claim 1, wherein the composition comprises the polysilsesquioxane and the fluorine-containing polymer matrix at a weight ratio of 10:90-80:20.

8. The carbon molecular sieve membrane according to claim 1, which comprises ultramicropores having an average size equal to or larger than 1 Å and less than 6 Å.

9. The carbon molecular sieve membrane according to claim 1, which comprises ultramicropores having an average size less than 6 Å and micropores having an average size of 6-20 Å.

10. The carbon molecular sieve membrane according to claim 9, which comprises the ultramicropores and micropores at a volume or area ratio of 0.1:99.9-10.0:90.0.

11. The carbon molecular sieve membrane according to claim 1, which separates gases at least one selected from the group consisting of: oxygen/nitrogen, carbon dioxide/carbon tetrachloride, carbon dioxide/nitrogen, nitrogen/carbon tetrachloride, n-butane/i-butane, ethylene/ethane and propylene/propane.

* * * * *